US010357760B2

(12) United States Patent
Tanaka et al.

(10) Patent No.: US 10,357,760 B2
(45) Date of Patent: Jul. 23, 2019

(54) AEI TYPE ZEOLITE, METHOD FOR PRODUCING SAME, AND USES THEREOF

(71) Applicant: MITSUBISHI CHEMICAL CORPORATION, Chiyoda-ku (JP)

(72) Inventors: Manabu Tanaka, Yokohama (JP); Takahiko Takewaki, Yokohama (JP); Takeshi Matsuo, Yokohama (JP); Masahiro Hara, Yokohama (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 68 days.

(21) Appl. No.: 15/601,382

(22) Filed: May 22, 2017

(65) Prior Publication Data

US 2017/0259250 A1 Sep. 14, 2017

Related U.S. Application Data

(63) Continuation-in-part of application No. PCT/JP2015/082802, filed on Nov. 20, 2015.

(30) Foreign Application Priority Data

Nov. 21, 2014 (JP) ................................. 2014-236668
Oct. 29, 2015 (JP) ................................. 2015-213136

(51) Int. Cl.
*C01B 39/48* (2006.01)
*B01J 29/70* (2006.01)
(Continued)

(52) U.S. Cl.
CPC ...... *B01J 29/7015* (2013.01); *B01D 53/9418* (2013.01); *B01J 23/72* (2013.01);
(Continued)

(58) Field of Classification Search
CPC ....... C01B 39/04; C01B 39/026; C01B 39/48; B01J 29/70; B01J 29/76; B01J 2229/186; B01D 53/9418
See application file for complete search history.

(56) References Cited

U.S. PATENT DOCUMENTS 4,503,024 A * 3/1985 Bourgogne ......... C01B 33/2869
423/709
5,958,370 A 9/1999 Zones et al.
(Continued)

FOREIGN PATENT DOCUMENTS

EP 2 857 356 A1 4/2015
JP 2010-514662 A 5/2010
(Continued)

OTHER PUBLICATIONS

European Partial Supplementary Search Report dated Oct. 30, 2017 in Patent Application No. 15860771.3.
(Continued)

*Primary Examiner* — David M Brunsman
(74) *Attorney, Agent, or Firm* — Oblon, McClelland, Maier & Neustadt, L.L.P.

(57) ABSTRACT

Provided is a method for producing an inexpensive, high-performance AEI type zeolite and an AEI type zeolite having a Si/Al ratio of 6.5 or less by using neither an expensive Y type zeolite as a raw material nor dangerous hydrofluoric acid. The method for producing an AEI type zeolite having a Si/Al ratio of 50 or less includes: preparing a mixture including a silicon atom material, an aluminum atom material, an alkali metal atom material, an organic structure-directing agent, and water; and performing hydrothermal synthesis of the obtained mixture, in which a compound having a Si content of 20% by weight or less and containing aluminum is used as the aluminum atom material; and the mixture includes a zeolite having a framework density of 14

(Continued)

T/1000 Å³ or more in an amount of 0.1% by weight or more with respect to $SiO_2$ assuming that all Si atoms in the mixture are formed in $SiO_2$.

13 Claims, 4 Drawing Sheets

(51) Int. Cl.
*C01B 39/02* (2006.01)
*B01J 29/76* (2006.01)
*B01D 53/94* (2006.01)
*B01J 23/72* (2006.01)
*B01J 35/00* (2006.01)
*B01J 35/04* (2006.01)
*B01J 37/00* (2006.01)
*B01J 37/10* (2006.01)
*F01N 3/20* (2006.01)
*B01J 37/02* (2006.01)
*C01B 39/04* (2006.01)
*B01D 53/22* (2006.01)

(52) U.S. Cl.
CPC ............... *B01J 29/70* (2013.01); *B01J 29/76* (2013.01); *B01J 35/002* (2013.01); *B01J 35/0006* (2013.01); *B01J 35/04* (2013.01); *B01J 37/0018* (2013.01); *B01J 37/0246* (2013.01); *B01J 37/10* (2013.01); *C01B 39/026* (2013.01); *C01B 39/48* (2013.01); *F01N 3/2066* (2013.01); *B01D 53/228* (2013.01); *B01D 2251/2062* (2013.01); *B01D 2255/2027* (2013.01); *B01D 2255/20761* (2013.01); *B01D 2255/50* (2013.01); *B01D 2255/911* (2013.01); *B01D 2255/9202* (2013.01); *B01D 2255/9207* (2013.01); *B01J 37/0009* (2013.01); *B01J 2229/186* (2013.01); *C01B 39/04* (2013.01); *C01P 2002/86* (2013.01); *F01N 2370/04* (2013.01); *F01N 2510/063* (2013.01); *F01N 2570/14* (2013.01); *Y02T 10/24* (2013.01)

(56) References Cited

U.S. PATENT DOCUMENTS

| | | | |
|---|---|---|---|
| 9,919,296 B2* | 3/2018 | Yang | B01J 29/70 |
| 2002/0165090 A1 | 11/2002 | Janssen et al. | |
| 2004/0215044 A1 | 10/2004 | Mertens et al. | |
| 2006/0135349 A1 | 6/2006 | Mertens et al. | |
| 2007/0100185 A1 | 5/2007 | Cao et al. | |
| 2014/0271426 A1 | 9/2014 | Casci et al. | |
| 2015/0118134 A1 | 4/2015 | Marin et al. | |
| 2015/0151979 A1 | 6/2015 | Okaniwa et al. | |
| 2015/0238947 A1 | 8/2015 | Casci et al. | |
| 2016/0016146 A1 | 1/2016 | Hagio et al. | |
| 2016/0144347 A1* | 5/2016 | Sano | B01D 53/8628 423/700 |
| 2016/0264428 A1* | 9/2016 | Moulton | C01B 39/48 |
| 2018/0093895 A1* | 4/2018 | Corma Canos | B01J 29/70 |
| 2018/0230017 A1* | 8/2018 | Ishikawa | C01B 39/48 |

FOREIGN PATENT DOCUMENTS

| | | |
|---|---|---|
| JP | 2014-80345 A | 5/2014 |
| JP | 2014-141385 | 8/2014 |
| JP | 2015-134698 A | 7/2015 |
| WO | WO 2005/063624 A1 | 7/2005 |
| WO | WO 2008/083045 A2 | 7/2008 |
| WO | WO 2013/159825 A1 | 10/2013 |
| WO | WO 2013/176227 A1 | 11/2013 |
| WO | WO 2014/157324 A1 | 10/2014 |
| WO | WO 2015/005369 A1 | 1/2015 |

OTHER PUBLICATIONS

Extended European Search Report dated Mar. 9, 2018 in Patent Application No. 15860771.3, citing documents AA-AB, AO and AX-AY therein, 23 pages.
Greg S. Lee, et al., "Polymethylated [4.1.1] Octanes Leading to Zeolite SSZ-50", Journal of Solid State Chemistry, vol. 167, No. 2, XP055313535, 2002, pp. 289-298.
Yuxin Li, et al., "Hierarchical SAPO-34/18 zeolite with low acid site density for converting methanol to olefins", Catalysis Today, vol. 233, XP029033546, 2014, pp. 2-7.
International Search Report dated Jan. 19, 2016 in PCT/JP2015/082802 (with English Translation).
International Preliminary Report on Patentability and Written Opinion dated Jun. 1, 2017 in PCT/JP2015/082802 (English Translation only).
Raquel Martinez-Franco et al., "Direct Synthesis Design of Cu-SAPO-18, a Very Efficient Catalyst for the SCR of NOx", Journal of Catalysis, vol. 319, 2014, pp. 36-43.
Manuel Moliner et al., "Cu-SSZ-39, an Active and Hydrothermally Stable Catalyst for the Selective Catalytic Reduction of NOx", ChemComm, vol. 48, 2012, pp. 8264-8266.
Toshihiro Maruo et al., "Facile Synthesis of AEI Zeolites by Hydrothermal Conversion of FAU Zeolites in the Presence of Tetraethylphosphonium Cations", Chem. Lett. vol. 43, No. 3, 2014, pp. 302-304.
First Office Action with Search Report, dated Oct. 18, 2018 in corresponding Chinese Patent Application No. 201580063141.0 with English Translation.

* cited by examiner

AEI TYPE ZEOLITE, METHOD FOR PRODUCING SAME, AND USES THEREOF

CROSS-REFERENCE TO RELATED APPLICATION

This is a continuation-in-part of International Application PCT/JP2015/082802, filed on Nov. 20, 2015, and designated the U.S., and claims priority from Japanese Patent Application No. 2014-236668, filed on Nov. 21, 2014, and Japanese Patent Application No. 2015-213126, filed on Oct. 29, 2015, the entire contents of which are incorporated herein by reference.

TECHNICAL FIELD

The present invention relates to an AEI type zeolite, a method for producing the AEI type zeolite, and uses of the AEI type zeolite. Specifically, the present invention relates to a method for producing an inexpensive, high-performance AEI type zeolite by using neither an expensive Y type zeolite as a raw material nor dangerous hydrofluoric acid, an AEI type zeolite that is produced by the method and has high catalyst performance, and uses of the AEI type zeolite.

BACKGROUND ART

Zeolites, having molecular-sieve effects based on pores derived from the framework structures of the zeolites as well as properties such as ion exchange abilities, catalytic abilities, and adsorption abilities, have been currently widely used as adsorbents, ion exchange agents, industrial catalysts, and environmental catalysts.

For example, catalysts for exhaust gases, using zeolites on which a metal such as copper is supported, specifically, a CHA type aluminosilicate zeolite and a silicoaluminophosphate (SAPO) zeolite, have been developed. Notations such as the AEI type and the CHA type are codes that define the framework structures of zeolites, specified by the International Zeolite Association (IZA).

The AEI type zeolite has been known to have the same sizes of the pores of the zeolite as those of the CHA type zeolite but to have a structure having higher catalytic activity. An example in which the AEI type zeolite is used in a selective catalytic reduction (SCR) catalyst is detailed in Patent Literature 1. A catalyst with a low Si/Al ratio has been known to be able to be more preferably used when being used as an SCR catalyst for exhaust gas treatment from an automobile or the like, particularly in order to reliably perform treatment of an exhaust gas at the time of low-temperature operation such as the time of start. This is because in the case of an aluminosilicate-based zeolite, the coordination sites of transition metals and the like which become active sites are aluminum sites, and therefore, the catalyst with a low Si/Al ratio, having many active sites, is more advantageous.

A production method described in Patent Literature 2 is basic to common methods for producing an AEI type zeolite. In the specific production method in such a case, for example, DMDMPOH (N,N-dimethyl-3,5-dimethylpiperidinium hydroxide) as an organic structure-directing agent (SDA) is added to a Y type zeolite (framework density: 12.7 T/1000 Å$^3$) and colloidal silica as raw materials, and the resultant is stirred in the presence of NaOH and subjected to hydrothermal synthesis for 8 days, thereby obtaining an AEI type zeolite. In this Patent Literature 2, it is described that the synthesis is possible even when aluminum sulfate, aluminum hydroxide, or the like is used, but experiments were actually conducted by using a Y type zeolite as a raw material and changing an SDA in substantially all Examples. In addition, it is current common technical knowledge that it is actually impossible to synthesize an AEI type zeolite when no Y type zeolite is used in the common production methods. This is corroborated by a description that "Although synthesis using Al(OH)$_3$ as a raw material was attempted, no crystalline oxide was obtained" in for example, Non Patent Literature 1 or the like.

In Patent Literature 1, a Y type zeolite is also used as a raw material.

Patent Literature 3 discloses that an AEI type zeolite is obtained by a method for producing an AEI type zeolite with the use of inexpensive aluminum nitrate as a raw material, the method including mixing aluminum nitrate and tetraethylorthosilicate (TEOS) with SDA and then adding hydrofluoric acid. The method disclosed in Patent Literature 3 is a method for producing an AEI type zeolite having a Si/Al ratio of 200 or more, wherein the use of hydrofluoric acid prevents Al from being taken in zeolite as much as possible.

Patent Literature 4 described that an AEI type zeolite is obtained from aluminum oxide but does not describe that an AEI type zeolite was able to be actually produced in Examples and the like. In Patent Literature 4, there is used a production method, referred to as a dry gel conversion method, including treating a dry gel obtained by drying a raw material mixture for synthesizing a zeolite with steam or steam containing a volatile organic amine, thereby crystallizing a zeolite. In this method, it is still difficult to industrially mass-produce a homogeneous zeolite, and it has been desired to be able to perform production by a time-proven hydrothermal method.

Non Patent Literature 2 discloses a method for synthesizing an AEI type zeolite from a structure-directing agent containing phosphorus and a raw material containing a Y type zeolite. However, when a phosphorus compound is used as the structure-directing agent, hazardous diphosphorus pentaoxide may be generated by calcining a zeolite synthesized in order to remove the structure-directing agent, and a step is complicated in the case of removing phosphorus by treatment such as extraction. Therefore, the method using the structure-directing agent containing phosphorus is an industrially undesirable method.

Even when each method is used, a Si/Al ratio can be decreased merely to around 7. In Comparative Example 3 in Patent Literature 5, it is described that an AEI type zeolite having a Si/Al ratio of 5.5 was produced by using a Y type zeolite as a raw material; however, it was possible to obtain only the AEI type zeolite having extremely low crystallinity, e.g., having almost no activity after hydrothermal endurance treatment. Therefore, a production method capable of producing an AEI type zeolite having an arbitrary Si/Al ratio, particularly an AEI type zeolite having a lower Si/Al ratio, and a method for producing the AEI type zeolite have been demanded.

CITATION LIST

Patent Literature

Patent Literature 1: International Publication No. WO 2013/159825
Patent Literature 2: U.S. Pat. No. 5,958,370
Patent Literature 3: International Publication No. WO 2005/063624

Patent Literature 4: National Publication of International Patent Application No. 2010-514662
Patent Literature 5: International Publication No. WO 2015/005369

Non Patent Literature

Non Patent Literature 1: Chemical, Communications, 48, 8264-8266.
Non Patent Literature 2: Chemistry Letters (2014), Vol. 43, No. 3 P302-304

SUMMARY OF INVENTION

Technical Problem

Hydrofluoric acid used in Patent Literature 3 is very dangerous acid, and furthermore, it is industrially impractical to use hydrofluoric acid in hydrothermal synthesis in which temperature becomes high. As described above, there is a problem that it is difficult to apply a use of a Y type zeolite as a raw material to a use of a large amount of Y type zeolite, such as a catalyst for selective reduction reaction (SCR) of NOx contained in an exhaust gas or the like from an automobile or the like, in view of the cost of the Y type zeolite.

As described above, a production method capable of producing an AEI type zeolite having an arbitrary Si/Al ratio and favorable crystallinity, particularly an AEI type zeolite having a lower Si/Al ratio, and a method for producing the AEI type zeolite have been demanded.

An object of the present invention is to provide: a method for producing an inexpensive, high-performance AEI type zeolite by using neither an expensive Y type zeolite as a raw material nor dangerous hydrofluoric acid; an AEI type zeolite that is produced by the method and has high catalyst performance; and a catalyst including the AEI type zeolite. Another object of the present invention is to provide: a method for producing an AEI type zeolite of which the Si/Al ratio can be arbitrarily changed; and in addition, an AEI type zeolite having a Si/Al ratio of 6.5 or less and favorable crystallinity.

Solution to Problem

As a result of diligently examining a method for producing an AEI type zeolite by a hydrothermal synthesis method using neither hydrofluoric acid nor a Y type zeolite, the present inventors found that use of a zeolite having a framework density of 14 T/1000 Å$^3$ or more as one of raw materials enables an AEI type zeolite to be obtained at high yield by using neither a Y type zeolite nor a dangerous chemical such as hydrofluoric acid, the AEI type zeolite produced by the method is superior in catalytic activity to a conventional AEI type zeolite obtained by using a Y type zeolite as a raw material, it is possible to produce an AEI type zeolite having an arbitrary Si/Al ratio, and it is also possible to produce an AEI type zeolite having favorable crystallinity and a Si/Al ratio of 6.5 or less, and the present invention was accomplished.

[1] A method for producing an AEI type zeolite having a Si/Al ratio of 50 or less, the method including: a step of preparing a mixture including a silicon atom material, an aluminum atom material, an alkali metal atom material, an organic structure-directing agent, and water; and a step of performing hydrothermal synthesis by using the mixture obtained in the step, wherein the aluminum atom material is a compound having a Si content of 20% by weight or less and containing aluminum; and the mixture includes a zeolite having a framework density of 14 T/1000 Å$^3$ or more in an amount of 0.1% by weight or more with respect to $SiO_2$ assuming that all Si atoms in the mixture are formed in $SiO_2$.

[2] The method for producing an AEI type zeolite according to [1], wherein 50 mol % or more of alkali metal atoms contained in the alkali metal atom material in the mixture is sodium; and the molar ratio of sodium to the organic structure-directing agent in the mixture is 0.1 or more and 2.5 or less.

[3] The method for producing an AEI type zeolite according to [1], wherein less than 50 mol % of alkali metal atoms contained in the alkali metal atom material in the mixture is sodium; and the total molar ratio of alkali metal atoms to the organic structure-directing agent in the mixture is 1.0 or more and 10 or less.

[4] The method for producing an AEI type zeolite according to any of [1] to [3], wherein the aluminum atom material is at least one selected from the group consisting of aluminum hydroxide, aluminum nitrate, aluminum sulfate, aluminum oxide, sodium aluminate, boehmite, pseudoboehmite, and aluminum alkoxide.

[5] The method for producing an AEI type zeolite according to any of [1] to [4], wherein d6r defined as a composite building unit by the International Zeolite Association (IZA) is contained in the framework of the zeolite having a framework density of 14 T/1000 Å$^3$ or more.

[6] The method for producing an AEI type zeolite according to any of [1] to [5], wherein the zeolite having a framework density of 14 T/1000 Å$^3$ or more is an AEI type and/or a CHA type.

[7] The method for producing an AEI type zeolite according to any of [1] to [6], wherein the organic structure-directing agent in the mixture is N,N-dimethyl-3,5-dimethylpiperidinium hydroxide.

[8] An AEI type zeolite obtained by the method for producing an AEI type zeolite according to any of [1] to [7].

[9] An AEI type zeolite having an acidity of 1.2 mmol/g or more and 3.0 mmol/g or less and a Si/Al ratio of 6.5 or less.

[10] An AEI type zeolite, wherein the ratio of the Si/Al ratio of a calcined zeolite determined by $^{29}$Si-NMR to a Si/Al ratio $\{^{29}$Si-NMR (Si/Al ratio)/XRF (Si/Al ratio)$\}$ is 90% or more and 200% or less; and the XRF (Si/Al ratio) is 20 or less.

[11] The AEI type zeolite according to any of [8] to [10], wherein the AEI type zeolite includes potassium and/or cesium at a molar ratio of 0.001 or more and 1.0 or less with respect to aluminum.

[12] The AEI type zeolite according to any of [8] to [11], wherein the AEI type zeolite has an average primary particle diameter of 0.01 μm or more and 3 μm or less.

[13] The AEI type zeolite according to any of [8] to [12], wherein the mixture excludes an FAU type zeolite.

[14] An AEI type zeolite from which an organic structure-directing agent has been removed by calcining, the AEI type zeolite having a Si/Al ratio of 6.5 or less determined by $^{29}$Si-NMR.

[15] A catalyst including the AEI type zeolite according to any of [8] to [14].

[16] The catalyst according to [15], wherein a metal other than Si and Al is supported on the AEI type zeolite.

[17] The catalyst according to [16], wherein Cu is supported on the AEI type zeolite.

[18] The catalyst according to [17], wherein the catalyst has a Cu content of 0.1% by weight or more and 10% by weight or less.

[19] The catalyst according to any of [15] to [18], wherein the AEI type zeolite includes potassium and/or cesium; and the molar ratio of the potassium and/or the cesium to aluminum in the catalyst is 0.001 or more and 1.0 or less.

[20] The catalyst according to any of [15] to [19], wherein the catalyst is a catalyst for exhaust gas treatment.

[21] The catalyst according to [20], wherein the catalyst is a selective reduction catalyst for an exhaust gas containing a nitrogen oxide.

[22] A method for producing a catalyst, the method including supporting Cu on an AEI type zeolite obtained by the method for producing an AEI type zeolite according to any of [1] to [7].

[23] A honeycomb catalyst, wherein the catalyst according to [20] or [21] is applied to a honeycomb.

[24] A catalyst molded article formed by molding the catalyst according to [20] or [21].

[25] A method for purifying a nitrogen oxide, the method including bringing a nitrogen oxide into contact with a reducing agent in the presence of the catalyst according to [20], [21], or [23].

[26] The method for purifying a nitrogen oxide according to [25], wherein the reducing agent is a nitrogen-containing compound.

[27] The method for purifying a nitrogen oxide according to [26], wherein the nitrogen-containing compound is ammonia.

[28] An exhaust gas purification system including a selective reduction type nitrogen oxide purification catalyst containing the catalyst according to [20], [21], or [23].

[29] The exhaust gas purification system according to [28], wherein the exhaust gas purification system includes an ammonia oxidation catalyst downstream of the selective reduction type nitrogen oxide purification catalyst.

[30] An exhaust gas purification method including a step of adsorbing ammonia in a selective reduction type nitrogen oxide purification catalyst and selectively reducing a nitrogen oxide by using the adsorbed ammonia as a reducing agent, wherein the catalyst according to [20], [21], or [23] is used as the selective reduction type nitrogen oxide purification catalyst.

[31] The exhaust gas purification method according to [30], wherein the method includes a step of oxidizing surplus ammonia downstream of the step of selectively reducing the nitrogen oxide by using the ammonia as the reducing agent.

Advantageous Effects of Invention

In accordance with the present invention, it is possible to reduce the cost of raw materials without using an expensive Y type zeolite and to obtain an AEI type zeolite under a favorable work environment without using dangerous hydrofluoric acid. Moreover, the AEI type zeolite obtained in the present invention is excellent in catalytic properties, and can be preferably used as a catalyst for exhaust gas treatment, particularly as a selective reduction catalyst for an exhaust gas containing a nitrogen oxide. In addition, a production method of the present invention enables an AEI type zeolite having a Si/Al ratio of 6.5 or less and excellent crystallinity to be obtained, and a catalyst having an excellent exhaust gas purification performance can be obtained by using the AEI type zeolite as an SCR catalyst. In addition, the present invention is superior in yield to the case of using a Y type zeolite as a raw material and enables the Si/Al ratio of the obtained AEI type zeolite to be in a wider range than those in conventional methods.

DESCRIPTION OF EMBODIMENTS

Figure 1:
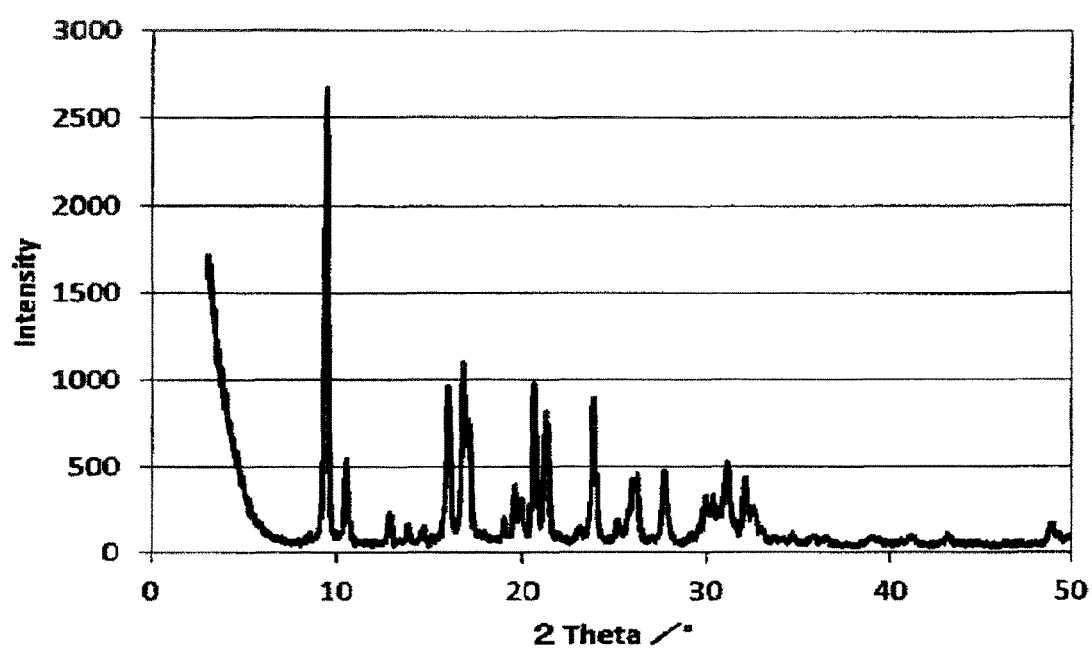
FIG. 1 is a chart illustrating the XRD pattern of a zeolite 1 synthesized in Example 1.

Embodiments of the present invention will be described in detail below. However, the following description is an example (representative example) of aspects of the present invention, and the present invention is not limited to the contents thereof at all. The aspects of the present invention may also be combined as appropriate. Herein, a range using "to" means a range inclusive of a numerical values immediately preceding "to" and a numerical value immediately following "to".

[Method for Producing AEI-Type Zeolite]

A method for producing an AEI type zeolite of the present invention is a method for producing an AEI type zeolite having a Si/Al ratio of 50 or less, the method including: a step of preparing a mixture including a silicon atom material, an aluminum atom material, an alkali metal atom material, an organic structure-directing agent, and water; and a step of performing hydrothermal synthesis of the mixture obtained in the step, wherein the aluminum atom material is a compound having a Si content of 20% by weight or less and containing aluminum; and the mixture includes a zeolite having a framework density of 14 T/1000 Å$^3$ or more in an amount of 0.1% by weight or more with respect to $SiO_2$ assuming that all Si atoms in the mixture are formed in $SiO_2$.

An AEI type zeolite produced in an embodiment of the present invention (hereinafter may be referred to as "AEI type zeolite of the present invention") corresponds to a code for defining an AEI structure in codes for defining the framework structures of zeolites specified by the International Zeolite Association (IZA). The structure is characterized by X-ray diffraction data. However, in the case of measurement of an actually produced zeolite, the measurement is influenced by the growth direction of the zeolite, the ratio of constituent elements, an adsorbed substance, the presence of a defect, a dry state, and the like, the intensity ratio and peak position of each peak slightly deviate, therefore, exactly the same numerical value as each parameter of the AEI structure described in the definition of the IZA is not obtained, and a band of around 10% is within tolerance.

For example, in the case of using CuKα line as a radiation source, examples of main peaks in X-ray diffraction include the peak of a 110 plane at 2θ=9.50±0.20, the peaks of 202 and −202 planes at 2θ=16.10±0.20 (which are very close to each other and often overlap one another), the peak of a 022 plane at 16.90±0.20, and the peak of a 310 plane at 20.60±0.20.

The zeolite, which is a zeolite defined by the International Zeolite Association (IZA), is preferably an aluminosilicate zeolite. The aluminosilicate zeolite contains at least oxygen (O), aluminum (Al), and silicon (Si) as atoms included in the framework structure thereof, and some of the atoms may be substituted by another atom (Me).

The constituent ratios (molar ratios) of Me, Al, and Si included in the framework structure of the aluminosilicate zeolite are not particularly limited. However, assuming that the molar ratio of Me is x, the molar ratio of Al is y, and the molar ratio of Si is z, with respect to the total of Me, Al, and Si, x is typically 0 or more and 0.3 or less. In a case in which x is the upper limit or less, admixture of impurities is inhibited in synthesis, and the case is preferred.

Further, y is typically 0.001 or more, preferably 0.005 or more, more preferably 0.01 or more, and still more preferably 0.05 or more, and typically 0.5 or less, preferably 0.4 or less, more preferably 0.3 or less, and still more preferably 0.25 or less.

Further, z is typically 0.5 or more, preferably 0.6 or more, more preferably 0.7 or more, and still more preferably 0.75 or more, and typically 0.999 or less, preferably 0.995 or less, more preferably 0.99 or less, and still more preferably 0.98 or less.

When y and z are in the ranges described above, synthesis is facilitated, sufficient acid sites are present in the case of using the zeolite as a catalyst, and it is easy to obtain sufficient activity.

The other atom Me may be included singly, or in two or more kinds thereof. Preferred Me is an element belonging to the third or fourth period of the periodic table.

<Zeolite Having Framework Density of 14 T/1000 Å³ or More>

The features of the method for producing an AEI type zeolite of the present invention are: using no hydrofluoric acid; using a compound having a Si content of 20% by weight or less and containing aluminum as an aluminum atom material; and adding a zeolite having a framework density of 14 T/1000 Å³ or more (hereinafter, the zeolite may be referred to as "zeolite added in the present invention"). The framework density is a value described in Ch. Baerlocher et al., ATLAS OF ZEOLITE FRAME WORK TYPES (Sixth Revised Edition, 2007, ELSEVIER), and is a value representing a skeletal density.

In other words, the framework density means the number of T atoms (atoms that are included in framework structure of zeolite and are other than oxygen atoms) existing per unit volume of 1000 Å³ of a zeolite, and the value of the framework density depends on the structure of the zeolite.

As for an action and effect in the step of producing the AEI type zeolite by using the zeolite having a framework density of 14 T/1000 Å³ or more, it is presumed that the zeolite is not completely decomposed into the ions of respective elements in the mixture of raw materials prior to hydrothermal synthesis, but is in the state of being dissolved, in an embryo form in which several molecules are bound, in the mixture, and assists the hydrothermal synthesis of the AEI type zeolite to proceed. In view of inhibiting the complete decomposition into the ions of the respective single elements in the mixture of the raw materials, the framework density is 14 T/1000 Å³ or more, preferably 14.1 T/1000 Å³ or more, more preferably 14.2 T/1000 Å³ or more, still more preferably 14.3 T/1000 Å³ or more, and particularly preferably 14.4 T/1000 Å³ or more. However, since the excessively high framework density results in existence of the zeolite added in the present invention in the mixture in the state of not being dissolved, the framework density of the zeolite added in the present invention is 20 T/1000 Å³ or less, more preferably 19 T/1000 Å³ or less, still more preferably 18.5 T/1000 Å³ or less, and particularly preferably 18 T/1000 Å³ or less.

From the viewpoint of the mechanism of the action of the above-described zeolite added in the present invention, a zeolite including d6r (double 6-membered ring) specified as a composite building unit by the International Zeolite Association (IZA) in the framework thereof is preferred among zeolites having a framework density of 14 T/1000 Å³ or more.

Specifically, such zeolites are AEI, AFT, AFX, CHA, EAB, ERI, GME, KFI, LEV, LTL, LTN, MOZ, MSO, MWW, OFF, SAS, SAT, SAV, SZR, and WEN, more preferably AEI, AFT, AFX, CHA, ERI, KFI, LEV, LTL, MWW, and SAV, still more preferably AEI, AFT, and CHA, and particularly preferably CHA type and AEI type zeolites.

The zeolite added in the present invention may be used singly, or in admixture of two or more kinds thereof.

In the present invention, the amount of the zeolite added in the present invention is 0.1% by weight or more with respect to $SiO_2$ assuming that all silicon (Si) atoms included in the mixture of the raw materials other than the zeolite added in the present invention are formed in $SiO_2$, and preferably 0.5% by weight or more, more preferably 2% by weight or more, still more preferably 3% by weight or more, and particularly preferably 4% by weight or more, for more smoothly promoting reaction. The upper limit of the amount of the zeolite added in the present invention is not particularly limited, but is typically 20% by weight or less, preferably 10% by weight or less, more preferably 8% by weight or less, and still more preferably 5% by weight or less, for sufficiently obtaining the effect of a reduction in cost.

The zeolite added in the present invention may be an uncalcined product that is not calcined after hydrothermal synthesis or a calcined product that is calcined after hydrothermal synthesis; however, since difficulty in dissolving the zeolite in an alkali is favorable for exhibition of a function as the nucleus of a crystal by the zeolite, the use of the uncalcined product is preferable to the use of the calcined product. However, the uncalcined zeolite may be undissolved and may fail to exhibit a function as the nucleus of a crystal depending on composition in the mixture of raw materials or on a temperature condition. In such a case, it is preferable to use a zeolite from which SDA is removed by calcining in order to enhance solubility.

Although some technologies for improving yield by adding a seed crystal are commonly found in methods for producing a zeolite, it is almost unknown that production of a desired type of zeolite is enabled by adding a specific zeolite to the mixture of raw materials from which the desired type of zeolite has not been able to be made on an as-is basis, like the present invention.

<Aluminum Atom Material>

In the present invention, since the low content of Si in the aluminum atom material commonly results in enhanced solubility in an alkali rises, causes the mixture of raw materials to be homogenized, and facilitates crystallization, a compound having a Si content of 20% by weight or less, preferably 15% by weight or less, more preferably 12% by weight or less, and still more preferably 10% by weight or less, and containing aluminum is used. The aluminum atom material is not particularly limited as long as satisfying this condition, but is preferably a compound that substantially excludes Si, and such compounds are amorphous aluminum hydroxide, aluminum hydroxide having a gibbsite structure, aluminum hydroxide having a bayerite structure, aluminum nitrate, aluminum sulfate, aluminum oxide, sodium aluminate, boehmite, pseudoboehmite, and aluminum alkoxide. The aluminum atom material is particularly preferably amorphous aluminum hydroxide, aluminum hydroxide having a gibbsite structure, and aluminum hydroxide having a bayerite structure. Among them, amorphous aluminum hydroxide is especially preferred. These may be used singly, or in admixture of two or more kinds thereof. These raw materials having stable quality are readily available, and greatly contribute to a reduction in cost, which is one of the advantageous effects of the present invention.

The amount of the aluminum atom material is typically 0.02 or more, preferably 0.04 or more, more preferably 0.06 or more, and still more preferably 0.08 or more in terms of the molar ratio of aluminum (Al) in the aluminum atom material to silicon (Si) included in the mixture of the raw materials other than the zeolite added in the present invention in view of the easiness of preparation of a mixture prior to reaction or an aqueous gel obtained by aging the mixture, and production efficiency. The upper limit thereof is not particularly limited, but is typically 2 or less, preferably 1 or less, more preferably 0.7 or less, still more preferably 0.6 or less, particularly preferably 0.4 or less, and most preferably 0.2 or less in view of homogeneously dissolving the aluminum atom material in an aqueous gel.

<Silicon Atom Material>

The silicon atom material used in the present invention is not particularly limited. As such silicon atom materials, known various substances can be used, for example, a zeolite having a framework density of less than 14 T/1000 Å$^3$ may be used, compounds including silicon other than zeolites are preferred, and colloidal silica, amorphous silica, sodium silicate, trimethylethoxysilane, tetraethylorthosilicate, aluminosilicate gel, and the like can be used. These may be used singly, or in admixture of two or more kinds thereof.

Among them, raw materials that are in the form of being able to be sufficiently homogeneously mixed with another component and are easily dissolved particularly in water are preferred, and colloidal silica, trimethylethoxysilane, tetraethylorthosilicate, and aluminosilicate gel are preferred.

The silicon atom material is used so that the amount of each of the other raw materials with respect to the silicon atom material is in the preferred above-described and later-described ranges.

<Alkali Metal Atom Material>

The alkali metal included in the alkali metal atom material used in the present invention is not particularly limited. Known alkali metals used in synthesis of zeolites can be used as such alkali metals, and it is preferable to include at least one alkali metal ion selected from the group consisting of lithium, sodium, potassium, rubidium, and cesium. Among them, it is particularly preferable to include sodium for the following reason.

In other words, particularly when a zeolite is used as an adsorbent or a catalyst, alkali metal atoms taken in in the crystal structure of the zeolite in a synthesis process may be removed from within a crystal by ion exchange. In this case, for simplifying the step of removing the alkali metal atoms, it is preferable that the alkali metal atoms used in the synthesis are sodium. Therefore, 50 mol % or more of the alkali metal atoms included in the alkali metal atom material is preferably allowed to be sodium, 80 mol % or more of the alkali metal atoms included in the alkali metal atom material is more preferably sodium, and substantially all are most preferably sodium.

In contrast, when the amount of the organic structure-directing agent described later is reduced to a low level, sodium in the alkali metal atoms included in the alkali metal atom material is preferably allowed to be not more than 50 mol %, and in this case, the molar ratio of the total of the alkali metal atoms to the organic structure-directing agent in the mixture of the raw materials is preferably 1.0 or more and 10 or less.

In this case, preferred examples of principal alkali metal atoms included in the mixture of the raw materials include potassium alone, cesium alone, and a mixture of potassium and cesium.

The inclusion of the alkali metal atoms facilitates proceeding of crystallization and inhibits generation of a by-product (impurity crystal).

Examples of such alkali metal atom materials that can be used include inorganic acid salts such as hydroxides, oxides, sulfates, nitrates, phosphates, chlorides, and bromides, and organic acid salts such as acetates, oxalates, and citrates of the alkali metal atoms described above. One or more of the alkali metal atom materials may be included.

Use of an adequate amount of the alkali metal atom material can facilitates generation of a crystal structure because of facilitating the coordination of the organic structure-directing agent described later to aluminum in a preferable state. Particularly, when 50 mol % or more of the alkali metal atoms included in the alkali metal atom material in the mixture of the raw materials is sodium, the molar ratio of sodium to the organic structure-directing agent in the mixture of the raw materials is preferably 0.1 or more and 2.5 or less, and the lower limit of the molar ratio is more preferably 0.15 or more, still more preferably 0.2 or more, particularly preferably 0.3 or more, and especially preferably 0.35 or more, and more preferably 2.4 or less, still more preferably 2 or less, particularly preferably 1.6 or less, and especially preferably 1.2 or less.

When less than 50 mol % of the alkali metal atoms included in the alkali metal atom material is sodium, from the viewpoint that use of an adequate amount of the alkali metal atom material can also facilitates generation of a crystal structure because of facilitating the coordination of the organic structure-directing agent described later to aluminum in a preferable state, it is preferable to perform the use so that the molar ratio of the alkali metal atoms to the organic structure-directing agent in the mixture of the raw materials is 1.0 or more and 10 or less, and the molar ratio is more preferably 1.3 or more, still more preferably 1.5 or more, particularly preferably 1.8 or more, and especially preferably 2.0 or more, and more preferably 8 or less, still more preferably 6 or less, particularly preferably 5 or less, and especially preferably 4 or less. Preferred examples of the alkali metal atom material in the case in which less than 50 mol % of the alkali metal atoms included in the alkali metal atom material is sodium include a potassium atom material alone, a cesium atom material alone, and a mixture of a potassium atom material and a cesium atom material, as described above. In the case of using the potassium atom material and/or the cesium atom material, the yield of the zeolite tends to be higher than that in the case of using the sodium atom material alone. In particular, it is particularly preferable to mix the potassium atom material with the cesium atom material. When the potassium atom material and/or the cesium atom material are used, the potassium atom material and/or the cesium atom material remain in the AEI type zeolite, and the zeolite including potassium and/or cesium at a molar ratio of 0.001 or more and 1.0 or less with respect to aluminum is obtained. When potassium and cesium are included, the molar ratio is set at the molar ratio of the total amount of the potassium and the cesium. Assuming that the total amount of the potassium and the cesium is % by weight in the zeolite, the total amount is typically 0.01% by weight or more and 10% by weight or less, and more preferably 0.05% by weight or more and 5% by weight or less. With regard to such a zeolite, a small amount of the organic structure-directing agent may be used, and a hydrothermal synthesis time may be short, in the production method.

<Organic Structure-Directing Agent>

Known various substances such as tetraethylammonium hydroxide (TEAOH) and tetrapropylammonium hydroxide (TPAOH) can be used as the organic structure-directing agent (also referred to as "template"; hereinafter, the organic structure-directing agent may be referred to as "SDA"). In addition, for example, the following substances can be used as an organic structure-directing agent containing nitrogen described in Patent Literature 2.

N,N-Diethyl-2,6-dimethylpiperidinium cation, N,N-dimethyl-9-azoniabicyclo[3.3.1]nonane, N,N-dimethyl-2,6-dimethylpiperidinium cation, N-ethyl-N-methyl-2,6-dimethylpiperidinium cation, N,N-diethyl-2-ethylpiperidinium cation, N,N-dimethyl-2-(2-hydroxyethyl)piperidinium cation, N,N-dimethyl-2-ethylpiperidinium cation, N,N-dimethyl-3,5-dimethylpiperidinium cation, N-ethyl-N-methyl-2-ethylpiperidinium cation, 2,6-dimethyl-1-azonium[5.4] decane cation, N-ethyl-N-propyl-2,6-dimethylpiperidinium cation, and the like. Among them, N,N-dimethyl-3,5-dimethylpiperidinium cation is preferred as the particularly preferred organic structure-directing agent containing nitrogen, and specifically, it is preferable to use N,N-dimethyl-3,5-dimethylpiperidinium hydroxide.

Substances such as tetrabutylphosphonium and diphenyldimethylphosphonium described in Non Patent Literature 2 can be used as organic structure-directing agents containing phosphorus.

However, since the phosphorus compound may generate diphosphorus pentaoxide which is a harmful substance when a synthesized zeolite is calcined to remove SDA as described above, the organic structure-directing agents containing nitrogen are preferred.

The organic structure-directing agents may be used singly, or in admixture of two or more kinds thereof.

From the viewpoint of the easiness of generation of a crystal, the organic structure-directing agent is used in an amount of typically 0.01 or more, preferably 0.03 or more, preferably 0.08 or more, more preferably 0.1 or more, and still more preferably 0.15 or more at a molar ratio with respect to silicon (Si) included in the mixture of the raw materials other than the zeolite added in the present invention. For sufficiently obtaining the effect of a reduction in cost, the molar ratio is typically 1 or less, preferably 0.8 or less, more preferably 0.6 or less, and still more preferably 0.5 or less.

<Water>

From the viewpoint of the easiness of generation a crystal, the water is used in an amount of typically 5 or more, preferably 7 or more, more preferably 9 or more, and still more preferably 10 or more at a molar ratio with respect to silicon (Si) included in the mixture of the raw materials other than the zeolite added in the present invention. The range further facilitates the generation of the crystal, and is preferred. For sufficiently obtaining the effect of a reduction of a cost needed for waste liquid treatment, the molar ratio with respect to silicon (Si) included in the mixture of the raw materials other than the zeolite added in the present invention is typically 50 or less, preferably 40 or less, more preferably 30 or less, and still more preferably 25 or less.

<Mixing of Raw Materials (Preparation of Mixture Prior to Reaction)>

In the production method of the present invention, the mixture obtained by mixing the aluminum atom material, the silicon atom material, the alkali metal atom material, the organic structure-directing agent, and the water described above is sufficiently mixed with the zeolite added in the present invention, thereby obtaining the mixture prior to reaction, and hydrothermal synthesis of the mixture prior to reaction is performed.

The order of mixing the raw materials including the zeolite added in the present invention is not particularly limited. However, it is preferable that the water, the organic structure-directing agent, and the alkali metal atom material are mixed to prepare an alkaline solution, followed by adding the aluminum atom material, the silicon atom material, and the zeolite added in the present invention in the order mentioned to the alkaline solution and mixing them, from the viewpoint that preferably, the raw materials are more homogeneously dissolved in the case of preparing an alkaline solution and then adding the silicon atom material and the aluminum atom material.

In the present invention, in addition to the aluminum atom material, the silicon atom material, the alkali metal atom material, the organic structure-directing agent, the water, and the zeolite added in the present invention described above, an auxiliary agent which becomes a component for contributing to synthesis of a zeolite, for example, another additive such as an acid component that promotes reaction or a metal stabilizing agent such as a polyamine may be added and mixed in an arbitrary step as needed, thereby preparing a mixture prior to reaction, or a metal such as copper which functions as a catalyst may be added in hydrothermal synthesis, as described later. In addition, production without using an FAU type zeolite as a raw material is preferred from the viewpoint of a cost, in the present invention. In other words, it is preferable that the mixture including the silicon atom material, the aluminum atom material, the alkali metal atom material, the organic structure-directing agent, and the water includes no FAU type zeolite in the production method of the present invention.

<Aging>

The mixture prior to reaction, prepared as described above, may be subjected to hydrothermal synthesis just after the preparation, but is preferably allowed to undergo aging for a predetermined time under a predetermined temperature condition in order to obtain a zeolite having high crystallinity. In particular, a scale-up easily results in the deterioration of stirring properties and in the insufficient state of admixture of raw materials. Therefore, it is preferable to improve the raw materials to be in a more homogeneous state by aging the raw materials while stirring the raw materials for a certain period. Aging temperature is typically 100° C. or less, preferably 95° C. or less, and more preferably 90° C. or less. The lower limit thereof is not particularly set, but is typically 0° C. or more and preferably 10° C. or more. The aging temperature may be constant during the aging, or may be stepwise or continuously varied. Aging time is not particularly limited, but is typically 2 hours or more, preferably 3 hours or more, and more preferably 5 hours or more, and typically 30 days or less, preferably 10 days or less, and still more preferably 4 days or less.

<Hydrothermal Synthesis>

The hydrothermal synthesis is performed by putting the mixture prior to reaction, prepared as described above, or an aqueous gel obtained by aging the mixture (hereinafter, "mixture prior to reaction" or "aqueous gel obtained by aging the mixture" may be referred to as a gel prior to hydrothermal synthesis) in a pressure-resistant container, and keeping a predetermined temperature under a self-generating pressure or under gas pressurization at the level of which crystallization is not inhibited, under stirring, while rotating or swinging the container, or in a standing state.

A reaction temperature in the hydrothermal synthesis is typically 120° C. or more, typically 230° C. or less, preferably 220° C. or less, more preferably 200° C. or less, and still more preferably 190° C. or less. A reaction time is not particularly limited, but is typically 2 hours or more, preferably 3 hours or more, more preferably 5 hours or more, and particularly preferably 1 day or more, and typically 30 days or less, preferably 10 days or less, more preferably 7 days or less, and still more preferably 5 days or less. The reaction temperature may be constant during the reaction, or may be stepwise or continuously varied.

The reaction under the above-described conditions is preferred because of resulting in improvement in the yield of the AEI type zeolite of interest and in inhibition of generation of different types of zeolites.

<Collection of AEI-Type Zeolite>

The AEI type zeolite which is a product is separated from a hydrothermal synthesis reaction liquid after the hydrothermal synthesis described above.

The obtained zeolite (hereinafter referred to as "zeolite containing SDA and the like") contains both or either of the organic structure-directing agent and the alkali metal atoms in pores. A method for separating the zeolite containing SDA and the like from the hydrothermal synthesis reaction liquid is not particularly limited. Typically, examples of the method include a method by filtration, decantation, direct drying, or the like.

The zeolite containing SDA and the like, separated and collected from the hydrothermal synthesis reaction liquid, can be washed with water, dried, and then subjected to calcining or the like as needed in order to remove the organic structure-directing agent and the like used in the production, thereby obtaining a zeolite that does not contain the organic structure-directing agent and the like.

When the AEI type zeolite of the present invention is used as a use of a catalyst (encompassing a catalyst support), an adsorbent, or the like, the zeolite is used after the removal of them as needed.

<Recycling of Filtrate Including Organic Structure-Directing Agent>

The hydrothermal synthesis reaction liquid obtained after the collection of the AEI type zeolite includes an unreacted structure-directing agent. By liquid chromatograph analysis, it was confirmed that in the method for producing an AEI type zeolite of the present invention, about 15% by weight of unreacted structure-directing agent was included in an aspect in which 50 mol % or more of the alkali metal atoms included in the alkali metal atom material was sodium, and about 8% by weight of unreacted structure-directing agent was included in an aspect in which less than 50 mol % of the alkali metal atoms included in the alkali metal atom material is sodium. By using a hydrothermal synthesis reaction liquid including such an unreacted structure-directing agent, a silicon atom material, an aluminum atom material, an organic structure-directing agent, and water as shortages may be added to prepare a mixture so that the mixture has the same preparation composition as that of the gel prior to the hydrothermal synthesis of the present invention, and hydrothermal synthesis of the mixture may be performed, thereby producing an AEI type zeolite.

As treatment for removing both or either of the organic structure-directing agent and the alkali metal, liquid phase treatment using an acid solution or a chemical liquid containing a component for decomposing an organic structure-directing agent, ion-exchange treatment using a resin or the like, or thermal decomposition treatment may be adopted, or these treatments may be used in combination. Typically, the contained organic structure-directing agent and the like can be removed by a method such as calcining at a temperature of 300° C. to 1000° C. under air, an inert gas containing oxygen, or an inert gas atmosphere, or extraction with an organic solvent such as an aqueous ethanol solution. In view of productability, it is preferable to remove the organic structure-directing agent and the like by calcining. In this case, a calcining temperature is preferably 400° C. or more, more preferably 450° C. or more, and still more preferably 500° C. or more, and preferably 900° C. or less, more preferably 850° C. or less, and still more preferably 800° C. or less. Nitrogen or the like can be used as the inert gas.

In the production method of the present invention, AEI type zeolites with Si/Al ratios in a wide range that have been conventionally unable to be produced can be produced by changing a preparation composition ratio. Thus, the Si/Al ratio of the obtained AEI type zeolite is not particularly limited; however, since more active sites for a catalyst are preferred, the Si/Al ratio is preferably 50 or less, more preferably 25 or less, still more preferably 15 or less, particularly preferably 10 or less, and especially preferably 7 or less. In particular, the AEI type zeolite having a Si/Al ratio of 6.5 or less and excellent crystallinity has not been previously obtained, and is a new substance. In contrast, when a zeolite containing a large amount of Al in the framework thereof is exposed to a gas including steam, Al in the framework is more likely to be desorbed, thereby causing the structure thereof to be broken. Therefore, the Si/Al ratio is preferably 2 or more, more preferably 3 or more, still more preferably 4 or more, and especially preferably 4.5 or more. In consideration of all the factors, the Si/Al ratio is preferably 5.5 or more and 7 or less, more preferably more than 5.5 and less than 7, and still more preferably 6 or more and 6.5 or less, for reducing the influence of the desorption of Al in the framework to a low level and maintaining high catalytic activity. Further, the AEI type zeolite obtained in the present invention particularly preferably has an acidity of 1.2 mmol/g or more and 3.0 mmol/g or less, and a Si/Al ratio of 6 or more and 6.5 or less.

In the present invention, the Si/Al ratio of a zeolite defined by the Si/Al ratio and an acidity is measured by XRF, as also described in Examples. Unless otherwise specified, the Si/Al ratio is a value determined by XRF in the present specification. However, results in ICP may be used because a Si/Al ratio obtained from XRF and a Si/Al ratio obtained by analysis in ICP are theoretically equal to each other, as is clear from the fact that an XRF calibration curve is determined from analysis results in ICP emission spectrochemical analysis (hereinafter may be referred to as "ICP"). In the case of "XRF (Si/Al ratio)", ICP may be similarly used.

Al taken in a zeolite framework in the state of unfavorable crystallinity, and the like are also measured in XRF. Zeolites having favorable crystallinity, excluding such zeolites having unfavorable crystallinity, can be defined by combining a Si/Al ratio and an acidity.

When a Si/Al ratio in a case in which Si and Al are taken with favorable crystallinity in a zeolite framework is measured, it is preferable to measure the Si/Al ratio by $^{19}$Si-(DD/)MAS-NMR (hereinafter may be referred to as "$^{29}$Si-NMR") or the like. In the case of the measurement using this $^{29}$Si-NMR, the AEI type zeolite having a low Si/Al ratio of the present invention may also be simply expressed as "AEI type zeolite having Si/Al ratio of 6.5 or less". The Si/Al ratio, determined by $^{29}$Si-NMR, of an AEI type zeolite after removal of SDA by calcining is preferably 6.5 or less, and the lower limit of the Si/Al ratio in this case is the same as the range described above.

A small difference between a Si/Al ratio as a bulk and a Si/Al ratio determined by $^{29}$Si-NMR after calcining also indicates that the AEI type zeolite of the present invention has excellent crystallinity. In other words, the Si/Al ratio of the AEI type zeolite after calcining, determined in XRF, is a Si/Al ratio as a bulk including silicon and aluminum in a moiety in which a framework has been broken in hydrothermal synthesis or by the calcining, whereas the Si/Al ratio determined in $^{29}$Si-NMR after calcining is a ratio between silicon and aluminum that are also maintained in the zeolite framework after the calcining. Ordinarily, dealuminization more easily occurs. Therefore, $^{29}$Si-NMR (Si/Al ratio)/XRF (Si/Al ratio) tends to be 100% or more in terms of %. In particular, in an AEI type zeolite having a low Si/Al ratio of, for example, 20 or less, dealuminization easily occurs and such a value is more than 200% because the zeolite includes a large amount of aluminum and has unfavorable crystallinity.

In contrast, the AEI type zeolite of the present invention is resistant to dealuminization even due to calcining because of having favorable crystallinity although having a low Si/Al ratio. This is a property that leads to high endurance in use and that is preferred for using the zeolite as a catalyst. Specifically, the AEI type zeolite has a ratio between the Si/Al ratio of the zeolite after calcining, determined by Si-NMR, and a Si/Al ratio as a bulk, which is expressed as an equation {$^{29}$Si-NMR (Si/Al ratio)/XRF (Si/Al ratio)} in terms of %, and of which the lower limit is preferably 90% or more, more preferably 95% or more, and still more preferably 100% or more, and of which the upper limit is preferably 200% or less, more preferably 190% or less, still more preferably 180% or less, and particularly preferably 160% or less. In addition, such a zeolite has the Si/Al ratio of which the upper limit is preferably 20 or less, more preferably 10 or less, and particularly preferably 6.5 or less, and of which the lower limit is preferably 2 or more and preferably 4 or more.

An SCR catalyst requires performance for purifying an exhaust gas including nitrogen oxides and a hydrothermal endurance of 650° C. or more. A zeolite having a low Si/Al ratio has an advantage of having high performance for purifying an exhaust gas including nitrogen oxides because the active sites of a zeolite having a low Si/Al ratio is more than those of a catalyst having a high Si/Al ratio if there is no difference between their crystallinities. For example, in a truck, the dealuminization of Al in a framework due to steam hardly proceeds because of use as an SCR catalyst under a gas atmosphere including steam at a comparatively low temperature of 700° C. or less. Accordingly, priority is assigned to performance for purifying an exhaust gas including nitrogen oxides, and it is desired to use a zeolite having a large amount of active sites in a zeolite framework and a Si/Al ratio of 6.5 or less. In contrast, a zeolite having a high Si/Al ratio has the advantage of being resistant to the breakage of the structure of the zeolite even under a high-temperature gas atmosphere including steam because the amount of Al in the framework of the zeolite is small. A diesel car or a gasoline vehicle requires high resistance to steam because of use as a SCR catalyst under a gas atmosphere including steam at 800° C. or more. Accordingly, it is desired to use a zeolite having a Si/Al ratio of more than 6.5 and more preferably 10 or more.

The average primary particle diameter of the AEI type zeolite obtainable in the present invention is not particularly limited, but is preferably 0.01 to 10 μm, more preferably 0.02 to 8 μm, and still more preferably 0.05 to 5 μm, for enhancing gas diffuseness in use as a catalyst. In particular, the average primary particle diameter of the AEI type zeolite of the present invention is preferably 0.01 μm or more and 3 μm or less, and is preferably in a range of 0.1 to 3 μm in view of ease of handling.

The average primary particle diameter of the AEI type zeolite is specifically measured by a method described in the sections of Examples described later.

The specific surface area of the AEI type zeolite obtained in the present invention is not particularly limited, but is preferably 300 to 1000 m$^2$/g, more preferably 350 to 800 m$^2$/g, and still more preferably 450 to 750 m$^2$/g in view of more active sites existing on inner surfaces of pores. The specific surface area of the AEI type zeolite of the present invention is measured by a BET method.

The crystallinity of the AEI type zeolite obtainable in the present invention is excellent. This is revealed by an acidity that can be measured in terms of the amount of the adsorption of ammonia at 160° C. or more. The acidity of the AEI type zeolite of the present invention is preferably 0.5 to 3.0 mmol/g, more preferably 0.7 to 3.0 mmol/g, still more preferably 0.9 to 3.0 mmol/g, particularly preferably 1.2 to 3.0 mmol/g, and most preferably 1.2 to 2.5 mmol/g. The acidity of the AEI type zeolite of the present invention is specifically measured by a method described in the sections of Examples described later.

In addition, it is particularly preferable that the AEI type zeolite obtained in the present invention has an acidity of 1.2 mmol/g or more and 3.0 mmol/g or less, and a Si/Al ratio of 4.5 or more and 6.5 or less as a bulk.

The ion exchange ability of the AEI type zeolite produced in the present invention can be used by converting an alkali metal moiety derived from an alkali metal atom including in the alkali metal atom material or in the aluminum atom material, the silicon atom material, the organic structure-directing agent, and the zeolite added in the present invention into a H type or a NH$_4$ type, and a known technology can be adopted as the method of the conversion. For example, a method of washing with water after treatment with an ammonium salt such as NH$_4$NO$_3$ or NaNO$_3$, or an acid such as hydrochloric acid typically at room temperature to 100° C. can be adopted.

(Addition of Alkaline Earth Metal)

In the present invention, the synthesis can be performed by adding an alkaline earth metal in the synthesis. It is commonly known that hydrothermal resistance properties are improved by adding an alkaline earth metal to a zeolite. In the production method of the present invention, the AEI type zeolite can also be produced by adding a compound containing an alkaline earth metal to the mixture of the raw materials prior to the hydrothermal synthesis. As the alkaline earth metal, magnesium, calcium, strontium, barium, and the like can be used, magnesium or calcium is preferred, and calcium is most preferred. The alkaline earth metal can be supplied typically in the form of a compound, which is not particularly limited and of which examples include oxides, hydroxides, and sulfides. It is preferable to add the alkaline earth metal in the form of a hydroxide.

[Uses of AEI-Type Zeolite]

Uses of the AEI type zeolite of the present invention are not particularly restricted. Preferred examples of the uses include a catalyst, an adsorbent, and a separation material. The AEI type zeolite is particularly preferably used in, e.g., a catalyst for purifying an exhaust gas from an automobile or the like, as described in the Patent Literature 1 described above. In particular, a Si/Al ratio of 6.5 or less results in high catalytic activity.

<Improvement in Hydrothermal Resistance by Post-Supported Metal Element>

Examples of methods for improving the hydrothermal resistance of the AEI type zeolite obtained in the present invention include a method for further supporting a metal (=M) on an AEI type zeolite after hydrothermal synthesis or a catalyst in which a metal (for example, Cu) for use as a catalyst described later is supported on an AEI type zeolite after hydrothermal synthesis. As the metal supported for improving the hydrothermal resistance, any of magnesium (Mg), calcium (Ca), strontium (Sr), lanthanum (La), praseodymium (Pr), boron (B), zirconium (Zr), cerium (Ce), and iron (Fe) may be used, or these metals may be used in admixture of two or more kinds thereof. AEI type zeolites containing metals may also be produced by adding salts of the metals to gels prior to the hydrothermal synthesis of the AEI type zeolites. In this case, inorganic acid salts such as sulfates, phosphates, nitrates, chlorides, and bromides, and organic acid salts such as acetates, oxalates, and citrates of transition metals, organometallic compounds such as pentacarbonyl and ferrocene, and the like are typically used. Among the salts, the inorganic acid salts and the organic acid salts are preferred from the viewpoint of solubility in water.

The effect of supporting the metals is considered to be the effect of protection from steam, obtained by the coordination of the metals to aluminum (Al) in a zeolite framework. The content of each metal is 0.0001 or more, preferably 0.0005 or more, and more preferably 0.001 or more, and still more preferably 0.005 or more in terms of the molar ratio of each metal to aluminum. The upper limit thereof is not particularly limited, but is typically 1 or less, preferably 0.95 or less, still more preferably 0.8 or less, and more preferably 0.5 or less because it is necessary to also perform the ion exchange of a transition metal which becomes an active site in the case of use as a catalyst.

<Method for Synthesizing AEI-Type Zeolite Containing Metal>

When a metal is supported on an AEI type zeolite, use of a method such as an ion exchange method or an impregnation method is prone to result in the problem of waste liquid treatment because of causing a large amount of waste liquid to be discharged, and in the increased number of steps because of requiring filtration, cleaning, and the like of zeolite-dipped slurry. In contrast, the present inventors found a one-pot synthesis method in which an AEI type zeolite including a metal is synthesized in one step by introducing a metal oxide or a metal salt as a metal raw material into a gel in a step for synthesizing a zeolite.

The metal raw material used in the one-pot synthesis method is not particularly limited. Examples of the metal raw material that is typically used include inorganic acid salts such as sulfates, phosphates, nitrates, chlorides, and bromides, and organic acid salts such as acetates, oxalates, and citrates of metals, and organometallic compounds such as pentacarbonyl and ferrocene. Among them, the inorganic acid salts and the organic acid salts are preferred from the viewpoint of solubility in water. In some cases, a colloidal oxide or a fine powdery oxide is preferred.

The metal is not particularly limited. In view of properties in adsorbent uses and catalyst uses, typical examples of the metal include the metals of Groups 3 to 12, such as iron (Fe), cobalt (Co), magnesium (Mg), zinc (Zn), copper (Cu), palladium (Pd), iridium (Ir), platinum (Pt), silver (Ag), gold (Au) cerium (Ce), lanthanum (La), praseodymium (Pr), titanium (Ti), and zirconium (Zr), in which the metals of Groups 8, 9, and 11 of the periodic table, such as iron, cobalt, and copper, are preferred, and the metals of Groups 8 and 11 are more preferred. The metal contained in the zeolite may be one of them, or two or more metals thereof may be contained in combination in the zeolite. Among the metals, iron and/or copper are particularly preferred, and copper is especially preferred.

As the metal atom material, two or more different kinds of metals or compounds may be used in combination.

For stabilizing the metal in the gel, it is also preferable to form a complex salt by using a polyamine. As the polyamine used for forming the complex salt, a polyamine represented by the general formula $H_2N-(C_nH_{2n}NH)_x-H$ (wherein n is an integer from 2 to 6, and x is an integer from 2 to 10) is preferred.

In the formula described above, n is preferably an integer from 2 to 5, more preferably an integer from 2 to 4, still more preferably 2 or 3, and particularly preferably 2, and x is preferably an integer from 2 to 6, more preferably an integer from 2 to 5, still more preferably 3 or 4, and particularly preferably 4.

As such polyamines, especially, diethylenetriamine, triethylenetetramine, tetraethylenepentamine are inexpensive and preferred, and especially, triethylenetetramine and tetraethylenepentamine are particularly preferred. The polyamines may be used singly, or in admixture of two or more kinds thereof. A branched-chain polyamine may be included.

When the one-pot synthesis method is used, the AEI type zeolite including the metal can be obtained according to the method for producing an AEI type zeolite of the present invention except that the metal, or the metal and the polyamine are used.

<Catalyst for Treating Exhaust Gas>

When the AEI type zeolite of the present invention is used as a catalyst for exhaust gas treatment, such as an automobile exhaust gas purification catalyst, the AEI type zeolite of the present invention may be used on an as-is basis, or the AEI type zeolite allowed to contain a metal as needed may be used. Specific examples of methods for allowing the zeolite to contain the metal include methods such as impregnation, and liquid-phase or solid-phase ion exchange. A zeolite allowed to contain a metal may also be directly synthesized by adding a metal (which may be a simple substance or a compound) prior to hydrothermal synthesis as described above. Examples of the state of the presence of the metal in the zeolite allowed to contain the metal include the cases of being contained and not being contained in a framework structure.

A catalyst including the AEI type zeolite of the present invention may be mixed with a binder, granulated, and used, or may be molded in a predetermined shape such as a honeycomb shape and used. Specifically, for example, the catalyst is mixed with an inorganic binder such as silica, alumina, or clay mineral, or inorganic fibers such as alumina fibers or glass fibers, then granulated or molded in a predetermined shape such as a honeycomb shape by an extrusion method, a compression method, or the like, and subsequently calcined, thereby obtaining a granular catalyst, a honeycomb catalyst, or a catalyst molded article.

The catalyst may also be applied to a substrate such as a sheet or a honeycomb, and used. Specifically, for example, the catalyst including the AEI type zeolite of the present invention is mixed with an inorganic binder such as silica, alumina, or clay mineral to produce slurry, which is applied to a surface of a substrate produced with an inorganic substance such as cordierite, and calcined, thereby producing a catalyst. Preferably, in such a case, a honeycomb catalyst having a honeycomb shape to which the catalyst is applied can be obtained by applying the slurry to a substrate having a honeycomb shape.

In this case, the inorganic binder is used because an explanation is given by taking the catalyst for exhaust gas treatment as an example. However, it will be appreciated that an organic binder may be used depending on uses or conditions for use.

The catalyst including the AEI type zeolite of the present invention is effective as a NOx selective reduction catalyst such as an automobile exhaust gas purification catalyst with which an exhaust gas including a nitrogen oxide is brought into contact to purify a nitrogen oxide.

A catalyst for exhaust gas treatment in which a metal other than Si and Al is contained in the AEI type zeolite of the present invention is also particularly effective as a NOx selective reduction catalyst. Preferred examples of the metal element contained in the zeolite for such a catalyst for exhaust gas treatment include transition metals, and are especially selected from the group of iron (Fe), cobalt (Co), palladium (Pd), iridium (Ir), platinum (Pt), copper (Cu), silver (Ag), gold (Au), cerium (Ce), lanthanum (La), praseodymium (Pr), titanium (Ti), zirconium (Zr), and the like. The metal element is still more preferably selected from iron or copper, and is most preferably Cu (copper). Two or more kinds of these metals may be contained in combination. The content of the metal other than Si and Al is typically 0.1% by weight or more, preferably 0.3% by weight or more, more preferably 0.5% by weight or more, and particularly preferably 1.0% by weight or more, and typically 20% by weight or less, preferably 10% by weight or less, and more preferably 8% by weight or less in the total amount of the AEI type zeolite containing the metal other than Si and Al.

Particularly, when the metal contained in the zeolite is copper (Cu), the content of copper in the catalyst is preferably 0.1% by weight or more and 10% by weight or less, and the more preferable range thereof is as described above.

A method for allowing the AEI type zeolite of the present invention to contain the metal described above is not particularly limited, and examples thereof include methods for supporting a metal on an AEI type zeolite by, e.g., an ion exchange method, an impregnation support method, a precipitation support method, a solid-phase ion exchange method, a CVD method, and a spray-drying method which are commonly used, and preferably by a solid-phase ion exchange method, an impregnation support method, and a spray-drying method.

The metal raw material is not particularly limited. Examples of the metal raw material that is typically used include inorganic acid salts such as sulfates, nitrates, phosphates, chlorides, and bromides, and organic acid salts such as acetates, oxalates, and citrates of the metal described above, and organometallic compounds such as pentacarbonyl and ferrocene. Among them, the inorganic acid salts and the organic acid salts are preferred, and more specifically, for example, the nitrates, the sulfates, the acetates, the hydrochlorides, and the like are preferred, from the viewpoint of solubility in water. In some cases, a colloidal oxide or a fine powdery oxide may also be used.

As the metal raw material, two or more different kinds of metals or compounds may be used in combination.

After supporting the above-described metal on the AEI type zeolite, it is preferable to perform calcining at preferably 300° C. to 900° C., more preferably 350° C. to 850° C., and still more preferably 400° C. to 800° C., for 1 second to 24 hours, preferably 10 seconds to 8 hours, and still more preferably 30 minutes to around 4 hours. The calcining is not necessarily required, but the calcining enables the dispersibility of the metal supported on the framework structure of the zeolite to be enhanced and is effective for improving catalytic activity.

The catalyst according to an embodiment of the present invention may include alkali metal atoms, for example, sodium, potassium, cesium, and the like, derived primarily from the raw materials. Among them, sodium which can be easily removed is not particularly limited, but the molar ratio of comparatively difficult-to-remove potassium, cesium, or the like to aluminum in the catalyst is preferably 0.001 or more and 1.0 or less. In other words, it is preferable that the molar ratio of potassium and/or cesium to aluminum in the catalyst is within the above-described range in view of preventing a zeolite framework and the like from being damaged by forcible removal from the catalyst.

The specific surface area of the catalyst obtained in the present invention is not particularly limited, but is preferably 300 to 1000 $m^2/g$, more preferably 350 to 800 $m^2/g$, and still more preferably 450 to 750 $m^2/g$ in view of more active sites existing on inner surfaces of pores. The specific surface area of the catalyst is measured by a BET method described in the sections of Examples described later.

<Exhaust Gas Purification System>

The exhaust gas may contain components other than nitrogen oxides, and may contain, for example, hydrocarbons, carbon monoxide, carbon dioxide, hydrogen, nitrogen, oxygen, sulfur oxides, and water. When catalysts are used, known reducing agents such as nitrogen-containing compounds such as ammonia, urea, hydrazine, ammonium carbonate, ammonium carbamate, ammonium hydrogen carbonate, and ammonium formate (excluding nitrogen oxides), and hydrocarbons may be used. Specifically, nitrogen oxides contained in various exhaust gases exhausted from diesel automobiles, gasoline automobiles, various diesel engines for stationary power generators, ships, agricultural machines, construction machines, two-wheeled vehicles, and aircrafts, boilers, gas turbines, and the like can be purified by the catalyst for exhaust gas treatment of the present invention.

In addition to uses of catalysts for purifying nitrogen oxides, the AEI type zeolite of the present invention can be used, for example, for uses of oxidation catalysts for oxidizing a surplus reducing agent (for example, ammonia) that has not been consumed in the purification of a nitrogen oxide in the latter step in which the nitrogen oxide is purified using the catalyst for purifying a nitrogen oxide of the present invention. In such a manner, the catalyst including the AEI type zeolite of the present invention as an oxidation catalyst can oxidize a surplus reducing agent to decrease a reducing agent in an exhaust gas. In this case, a catalyst in which a metal such as a platinum metal is supported on a support such as a zeolite for adsorbing a reducing agent can be used as the oxidation catalyst, and a catalyst can be used in which the AEI type zeolite of the present invention is used as the support or used as a selective reduction catalyst for a nitrogen oxide, and in which the metal such as a platinum metal is further supported on the AEI type zeolite of the present invention on which for example, iron and/or copper are supported.

The catalyst including the AEI type zeolite of the present invention can be used in various exhaust gas purification systems. Examples of the systems may include an exhaust gas purification system including a selective reduction type nitrogen oxide purification catalyst including the catalyst of the present invention, and an ammonia oxidation catalyst may be further arranged downstream of the selective reduction type nitrogen oxide purification catalyst in the exhaust gas purification system.

The catalyst including the AEI type zeolite of the present invention can be used in various exhaust gas purification methods. Examples of the exhaust gas purification methods include an exhaust gas purification method including the step of allowing ammonia to be adsorbed in a selective reduction type nitrogen oxide purification catalyst and selectively reducing a nitrogen oxide with the adsorbed ammonia as a reducing agent, in which a catalyst including an AEI zeolite is preferably used as the selective reduction type nitrogen oxide purification catalyst. The step of oxidizing surplus ammonia may be further included downstream of the step of selectively reducing the nitrogen oxide with the ammonia as the reducing agent.

Examples of the ammonia that can be used include ammonia introduced from the outside into an exhaust gas purification system, and ammonia generated from urea introduced from the outside into an exhaust gas purification system. Ammonia generated from an exhaust gas in an exhaust gas purification system can also be used.

In the case of using the catalyst of the present invention, the conditions of contact between the catalyst and an exhaust gas are not particularly limited, but the catalyst is used at a space velocity of the exhaust gas of typically 100/h or more, preferably 1000/h or more, and still more preferably 5000/h or more, and typically 500000/h or less, preferably 400000/h or less, and still more preferably 200000/h or less, and at a temperature of typically 100° C. or more, more preferably 125° C. or more, and still more preferably 150° C. or more, and typically 1000° C. or less, preferably 800° C. or less, still more preferably 600° C. or less, and particularly preferably 500° C. or less.

EXAMPLES

The present invention will be specifically described below with reference to Examples. However, the present invention is not limited at all by Examples described below unless deviating from the gist of the present invention.

[Analysis/Evaluation]

Analysis and performance evaluation of zeolites obtained in Examples and Comparative Examples described below were carried out by the following method.

[Measurement of Powder XRD]

<Preparation of Sample>

About 100 mg of zeolite sample ground with human power using an agate mortar was allowed to have a constant sample amount by using a sample holder having the same shape.

<Apparatus Specifications and Measurement Conditions>

Powder XRD measurement apparatus specifications and measurement conditions were as follows.

TABLE 1

| <Powder XRD Measurement Apparatus Specifications> | |
|---|---|
| Apparatus name | X'Pert Pro MPD manufactured by PANalytical Corporation, the Netherlands |
| Optical system | Focusing optical system |
| Optical system specifications Incident side | Sealed X-ray tube (CuKa) Soller Slit (0.04 rad) Divergence Slit (Variable Slit) Knife edge |
| Sample table | Rotational sample table (Spinner) |
| Light receiving side | Semiconductor array detector (X'C elerator) Ni-filter Soller Slit (0.04 rad) |
| Goniometer radius | 243 mm |
| <Measurement Conditions> | |
| X-ray power (CuKα) | 40 kV 30 mA |
| Scanning axis | θ/2θ |
| Scanning zone (2θ) | 3.0-50.0° |
| Measurement mode | Continuous |
| Reading width | 0.018° |
| Counting time | 29.8 sec |
| Automatic variable slit (Automatic-DS) | 10 mm (irradiation width) |

[Measurement of Si/Al Ratio by $^{29}$Si-NMR]

$^{29}$Si-NMR measurement apparatus specifications and measurement conditions are as follows.

A Si/Al ratio in a zeolite framework can be determined by this method.

TABLE 2

| Measurement conditions | |
|---|---|
| Apparatus | Varian NMR Systems 400WB manufactured by Varian |
| Probe | Probe for 7.5 mm φ HX CP/MAS |
| Observation nucleus | $^{29}$Si |
| Measurement method | DD (Dipolar Decoupling)/MAS (Magic Angle Spinning) method |
| $^{29}$Si resonance frequency | 79.43 MHz |
| $^{1}$H resonance frequency | 399.84 MHz |
| $^{29}$Si 90° pulse width | 5 μs |
| $^{1}$H decoupling frequency | 50 kHz |
| MAS rotation number | 5 kHz |
| Waiting time | 600 s |
| Spectral band width | 30.5 kHz |
| Measurement temperature | Room temperature |
| Cumulated number | 16 |

[Measurement of Average Primary Particle Diameter]

An average primary particle diameter in the present invention is equivalent to the particle diameter of a primary particle. The average primary particle diameter is determined by measuring the particle diameters of 30 or more primary particles arbitrarily selected in the observation of particles with a scanning electron microscope and by averaging the particle diameters of the primary particles. The particle diameters are regarded as the diameters (equivalent circle diameters) of circles having areas equal to the projection areas of the particles.

[Cu Content and Analysis of Zeolite Composition]

The contents of silicon and aluminum atoms in the zeolite which was a standard sample, and the elemental analysis of contained copper atoms were as follows.

The zeolite sample was dissolved in an aqueous hydrochloric acid solution by heating, followed by determining the contents (% by weight) of silicon atoms, aluminum atoms, and copper atoms by ICP analysis. In addition, the calibration curves of the fluorescent X-ray intensities of the analytical elements in the standard sample and the atomic concentrations of the analytical elements were created.

Based on the calibration curves, the contents (% by weight) of the silicon atoms, the aluminum atoms, and the copper atoms in the catalyst sample including the zeolite were determined by X-ray fluorescence analysis (XRF). The ICP analysis was carried out using ULTIMA 2C (apparatus name) manufactured by HORIBA, Ltd. XRF was carried out using EDX-700 (apparatus name) manufactured by SHIMADZU CORPORATION.

[Measurement of BET Specific Surface Area]

Measurement was carried out by a flow-type single-point method using a fully automatic powder specific surface area measurement apparatus (apparatus name: AMS1000) manufactured by Ohkura Riken In.

[Acidity: Measurement of Amount of Adsorbed Ammonia]

By using a fully automatic temperature-programmed desorption spectrum apparatus (apparatus name: BELCAT-B, manufactured by MicrotracBEL Corp.) manufactured by BEL Japan, Inc., the amount of adsorbed ammonia, typically referred to as acidity in evaluation of a zeolite, was measured under the following conditions.

Gases used:
Carrier gas: High-purity He
Adsorption gas: 5% $NH_3$/He
Pretreatment: The zeolite was retained at 450° C. for 1 hour under He flow at 50 sccm.
Adsorption of $NH_3$: 5% $NH_3$/He was allowed to flow at 50 sccm at 160° C. for 15 minutes so that $NH_3$ was adsorbed (to the zeolite).
Desorption/measurement: The temperature was raised from 160° C. to 800° C. at 10° C./min under He flow at 50 sccm so that $NH_3$ was desorbed, and the amount of desorbed $NH_3$ was regarded as the amount of adsorbed ammonia, i.e., acidity.

[Measurement of ICP]

The catalyst sample including the zeolite was treated with an aqueous hydrofluoric acid solution and thereafter further dissolved in an aqueous hydrochloric acid solution by heating, followed by determining the content of potassium by inductively coupled plasma (ICP) emission spectrochemical analysis.

[Evaluation of Catalytic Activity]

The prepared catalyst sample was press-formed, then crushed, passed through a sieve, and sized into 0.6 to 1 mm. One milliliter of the sized catalyst sample was filled into an atmospheric-pressure fixed-bed flow-type reaction tube. A catalyst layer was heated while allowing a gas having composition described in Table 2 below to pass through the catalyst layer at a space velocity SV of 200000/h. When an outlet NO concentration became constant at each temperature of 175° C., 200° C., 250° C., 300° C., 400° C., or 500° C., the nitrogen oxide removal activity of the catalyst sample was evaluated based on the value of:

NO purification rate (%)={(inlet NO concentration)−(outlet NO concentration)}/(inlet NO concentration)×100.

TABLE 3

| Gas component | Concentration |
| --- | --- |
| NO | 350 ppm |
| $NH_3$ | 385 ppm |

TABLE 3-continued

| Gas component | Concentration |
| --- | --- |
| $O_2$ | 15% by volume |
| $H_2O$ | 5% by volume |
| $N_2$ | The balance other than the above components |

[Method for Steam Treatment of Catalyst]

In order to evaluate catalytic activity after hydrothermal treatment, 10% by volume of steam at 800° C. was passed through 3 g of the catalyst sample at a space velocity SV of 3000/h for 5 hours, and steam treatment was performed.

[Synthesis of Zeolite]

Example 1

To a mixture of 1.8 g of water, 11.7 g of N,N-dimethyl-3,5-dimethylpiperidinium hydroxide (manufactured by SACHEM, Inc.) as an organic structure-directing agent (SDA), and 0.3 g of NaOH (manufactured by Wako Pure Chemical Industries, Ltd.), 0.4 g of amorphous $Al(OH)_3$ ($Al_2O_3$, 53.5% by weight, manufactured by Aldrich Corporation) was added, stirred, and dissolved to make a transparent solution. To the solution, 5.5 g of SNOWTEX 40 (silica concentration of 40% by weight, manufactured by Nissan Chemical Industries, Ltd.) was added, stirred at room temperature for 5 minutes, and 0.1 g of an AEI type zeolite (framework density of 15.1 T/1000 Å$^3$, Si/Al=7, SAR, silica/alumina ratio, of 14) which was an uncalcined product as "zeolite added in the present invention" was added and stirred at room temperature for 2 hours to obtain a mixture prior to reaction.

The mixture prior to reaction was put in a pressure-resistant container, and was subjected to hydrothermal synthesis for 4 days while rotating the container in an oven at 170° C. (15 rpm). After this hydrothermal synthesis reaction, the reaction liquid was cooled, and crystals generated were collected by filtration of the liquid. Measurement of the XRD of a zeolite powder obtained after drying the collected crystals at 100° C. for 12 hours confirmed that it was possible to synthesize an AEI type zeolite 1 exhibiting an XRD pattern having peaks and relative intensities at positions listed in Table 4 in terms of a lattice spacing. The XRD pattern of the zeolite 1 is illustrated in FIG. 1. In FIG. 1, the vertical axis indicates an intensity (cps) while the horizontal axis indicates a diffraction angle 2θ (°). The Si/Al ratio of the zeolite 1 based on the XRF analysis was 6.1.

TABLE 4

| 2 Theta/° | d-spacing (Å) | Relative Intensity [100 × I/I(O)] |
| --- | --- | --- |
| 9.46 | 9.35 | 100 |
| 10.58 | 8.36 | 20 |
| 16.03 | 5.52 | 36 |
| 16.86 | 5.25 | 41 |
| 17.13 | 5.17 | 29 |
| 19.61 | 4.52 | 15 |
| 20.63 | 4.30 | 37 |
| 21.27 | 4.17 | 30 |
| 23.90 | 3.72 | 33 |
| 25.99 | 3.43 | 16 |
| 27.72 | 3.22 | 18 |
| 31.11 | 2.87 | 20 |
| 32.10 | 2.79 | 16 |

Example 2

A zeolite powder was obtained in the same manner as that of Example 1 except that the amounts of raw materials used in a mixture prior to reaction were as listed in Table 10.

Measurement of the XRD of the obtained zeolite powder confirmed that it was possible to synthesize an AEI type zeolite 2 exhibiting an XRD pattern having peaks and relative intensities at positions listed in Table 5 in terms of a lattice spacing. The Si/Al ratio of the zeolite 2 based on the XRF analysis was 5.8.

TABLE 5

| 2 Theta/° | d-spacing (Å) | Relative Intensity [100 × I/I(O)] |
|---|---|---|
| 9.43 | 9.37 | 100 |
| 10.58 | 8.36 | 22 |
| 16.06 | 5.52 | 38 |
| 16.81 | 5.27 | 40 |
| 17.13 | 5.17 | 32 |
| 19.61 | 4.52 | 15 |
| 20.63 | 4.30 | 33 |
| 21.27 | 4.17 | 30 |
| 23.87 | 3.72 | 36 |
| 26.23 | 3.39 | 17 |
| 27.77 | 3.21 | 19 |
| 31.13 | 2.87 | 19 |
| 32.08 | 2.79 | 15 |

Example 3

A zeolite powder was obtained in the same manner as that of Example 1 except that the amounts of raw materials used in a mixture prior to reaction were as listed in Table 10.

Measurement of the XRD of the obtained zeolite powder confirmed that it was possible to synthesize an AEI type zeolite 3 exhibiting an XRD pattern having peaks and relative intensities at positions listed in Table 6 in terms of a lattice spacing. The Si/Al ratio of the zeolite 3 based on the XRF analysis was 5.2.

TABLE 6

| 2 Theta/° | d-spacing (Å) | Relative Intensity [100 × I/I(O)] |
|---|---|---|
| 9.43 | 9.37 | 100 |
| 10.55 | 8.38 | 23 |
| 16.06 | 5.52 | 41 |
| 16.83 | 5.26 | 46 |
| 17.15 | 5.17 | 34 |
| 19.63 | 4.52 | 22 |
| 20.68 | 4.29 | 43 |
| 21.27 | 4.17 | 37 |
| 23.90 | 3.72 | 43 |
| 26.21 | 3.40 | 26 |
| 27.72 | 3.22 | 22 |
| 31.15 | 2.87 | 25 |
| 32.10 | 2.79 | 19 |

Example 4

A zeolite powder was obtained in the same manner as that of Example 1 except that a reaction temperature (oven temperature) in hydrothermal synthesis was set at 135° C.

Measurement of the XRD of the obtained zeolite powder confirmed that it was possible to synthesize an AEI type zeolite 4 exhibiting an XRD pattern having peaks and relative intensities at positions listed in Table 7 in terms of a lattice spacing. The Si/Al ratio of the zeolite 4 based on the XRF analysis was 4.9.

TABLE 7

| 2 Theta/° | d-spacing (Å) | Relative Intensity [100 × I/I(O)] |
|---|---|---|
| 9.50 | 9.30 | 100 |
| 10.67 | 8.28 | 21 |
| 16.10 | 5.50 | 38 |
| 16.93 | 5.23 | 41 |
| 17.20 | 5.15 | 30 |
| 19.73 | 4.50 | 18 |
| 20.73 | 4.28 | 41 |
| 21.32 | 4.16 | 34 |
| 23.92 | 3.72 | 37 |
| 26.31 | 3.38 | 22 |
| 27.84 | 3.20 | 22 |
| 31.18 | 2.87 | 27 |
| 32.18 | 2.78 | 19 |

Example 5

A mixture prior to reaction was obtained in the same manner as that of Example 1, then put in a pressure-resistant container, allowed to undergo aging at 90° C. for 2 days, and then subjected to hydrothermal synthesis for 4 days while rotating the container in an oven at 170° C. (15 rpm). After this hydrothermal synthesis reaction, the reaction liquid was cooled, and crystals generated were collected by filtration of the liquid. Measurement of the XRD of a zeolite powder obtained after drying the collected crystals at 100° C. for 12 hours confirmed that it was possible to synthesize an AEI type zeolite 5 exhibiting an XRD pattern having peaks and relative intensities at positions listed in Table 8 in terms of a lattice spacing. The Si/Al ratio of the zeolite 5 based on the XRF analysis was 5.3.

TABLE 8

| 2 Theta/° | d-spacing (Å) | Relative Intensity [100 × I/I(O)] |
|---|---|---|
| 9.48 | 9.32 | 100 |
| 10.60 | 8.34 | 24 |
| 16.10 | 5.50 | 51 |
| 16.88 | 5.25 | 47 |
| 17.15 | 5.17 | 39 |
| 19.66 | 4.51 | 16 |
| 20.73 | 4.28 | 36 |
| 21.34 | 4.16 | 36 |
| 23.95 | 3.71 | 39 |
| 26.28 | 3.39 | 19 |
| 27.79 | 3.21 | 20 |
| 31.32 | 2.85 | 17 |
| 32.15 | 2.78 | 15 |

Comparative Example 1

Hydrothermal synthesis was carried out in the same manner as that of Example 1 except that the AEI type zeolite as the zeolite added in the present invention was not used (i.e., the step of adding SNOWTEX 40, then stirring the resultant for 5 minutes, and adding the AEI type zeolite was omitted), the amounts of raw materials used in a mixture prior to reaction were as listed in Table 12, a reaction temperature (oven temperature) in hydrothermal synthesis was set at 135° C., and a reaction time was set at 7 days. A product was collected and dried to obtain a solid 1.

Measurement of the XRD of the obtained solid 1 confirmed that no peak was seen and the solid was amorphous.

Comparative Example 2

Hydrothermal synthesis was carried out in the same manner as that of Example 1 except that the AEI type zeolite was not used (i.e., the step of adding SNOWTEX 40, then stirring the resultant for 5 minutes, and adding the AEI type zeolite was omitted) and the amounts of raw materials used in a mixture prior to reaction were as listed in Table 12. A product was collected and dried to obtain a solid 2.

Measurement of the XRD of the obtained solid 2 confirmed that no peak was seen and the solid was amorphous.

Comparative Example 3

To a mixture of 1.9 g of water, 5.5 g of N,N-dimethyl-3,5-dimethylpiperidinium hydroxide (manufactured by SACHEM, Inc.), and 20.5 g of IM (mol/L) aqueous NaOH solution (manufactured by Wako Pure Chemical Industries, Ltd.), 2.4 g of a Y type zeolite (USY30 CBV720, manufactured by Zeolyst International) (framework density of 12.7 T/1000 Å$^3$) was added, stirred, and dissolved to make a transparent solution. To the solution, 1.9 g of SNOWTEX 40 (silica concentration of 40% by weight, manufactured by Nissan Chemical Industries, Ltd.) was added and stirred at room temperature for 2 hours to obtain a mixture prior to reaction.

The mixture prior to reaction was put in a pressure-resistant container, and was subjected to hydrothermal synthesis for 7 days while rotating the container in an oven at 135° C. (15 rpm). After this hydrothermal synthesis reaction, the reaction liquid was cooled, and crystals generated were collected by filtration of the liquid. Measurement of the XRD of a zeolite powder obtained after drying the collected crystals at 100° C. for 12 hours confirmed that it was possible to synthesize an AEI type zeolite 6 exhibiting an XRD pattern having peaks and relative intensities at positions listed in Table 9 in terms of a lattice spacing. The Si/Al ratio of the zeolite 6 based on the XRF analysis was 7.3.

TABLE 9

| 2 Theta/° | d-spacing (Å) | Relative Intensity [100 × I/I(O)] |
|---|---|---|
| 9.43 | 9.37 | 100 |
| 10.55 | 8.38 | 25 |
| 16.03 | 5.52 | 55 |
| 16.83 | 5.26 | 51 |
| 17.13 | 5.17 | 45 |
| 19.61 | 4.52 | 16 |
| 20.68 | 4.29 | 43 |
| 21.29 | 4.17 | 37 |
| 23.90 | 3.72 | 42 |
| 26.26 | 3.39 | 21 |
| 27.74 | 3.21 | 23 |
| 31.23 | 2.86 | 18 |
| 32.10 | 2.79 | 15 |

Examples 7 to 29, and 31 to 38, and Comparative Example 5

The raw materials used and the charged amounts thereof in Example 1 were changed as listed in Tables 10 to 13, and a zeolite was synthesized in a similar procedure under hydrothermal synthesis conditions listed in Tables 10 to 13.

However, it was impossible to synthesize a zeolite in Comparative Example 5.

The raw materials used in the synthesis were detailed as follows:
KOH: manufactured by Wako Pure Chemical Industries, Ltd.
CsOH: manufactured by Mitsuwa Chemicals Co., Ltd.
CATALOID SI-30: manufactured by JGC Catalysts and Chemicals Ltd. (silica concentration: 30% by weight)
Fumed silica (AEROSIL 200): manufactured by NIPPON AEROSIL CO., LTD.

The AEI type zeolite used in Example 1 was used as an AEI type zeolite as a calcined product. A CHA type zeolite having a framework density of 15.1 T/1000 Å was used as a CHA type zeolite as an uncalcined product, and a CHA type zeolite obtained by calcining a CHA type zeolite as an uncalcined product at 600° C. was used as a CHA type zeolite as a calcined product.

Solids obtained in Examples 35 to 38 were calcined by the same method as that of Example 30 described later, and the results of the amounts of Ca therein, analyzed by ICP, were:
Example 35: 0.889% by weight;
Example 36: 0.843% by weight;
Example 37: 0.575% by weight; and
Example 38: 0.482% by weight.

This indicates that calcium was taken in the zeolites.

Comparative Example 6

An AEI type zeolite with $SiO_2/Al_2O_3$=11 (i.e., Si/Al ratio of 5.5) described in Comparative Example 3 of Patent Literature 5 was produced according to the description of Comparative Example 3 of Patent Literature 5. In other words, pure water, sodium hydroxide, an FAU type zeolite (Y type, cationic type: ammonium type, $SiO_2/Al_2O_3$ ratio=11: manufactured by JGC Catalysts and Chemicals Ltd.), and silicate soda No. 3 (manufactured by KISHIDA CHEMICAL Co., Ltd.) were added to an aqueous solution of 20% N,N-dimethyl-3,5-dimethylpiperazinium hydroxide (DMPOH), and the resultant was mixed to obtain the mixture of the raw materials with the following molar composition:
$SiO_2/Al_2O_3$ ratio=31;
$Na/SiO_2$ ratio=0.53;
$DMPOH/SiO_2$ ratio=0.16;
$OH/SiO_2$ ratio=0.69; and
$H_2O/SiO_2$ ratio=46.

The obtained mixture of the raw materials was filled into an airtight container, and the mixture of the raw materials was crystallized under the conditions of 135° C. and 15 days while rotating the container. The crystallized mixture of the raw materials was subjected to solid-liquid separation, washed with pure water, and then dried at 70° C., and the resultant was calcined under an air atmosphere at 600° C. for 6 hours. When the $SiO_2/Al_2O_3$ ratio of the obtained AEI type zeolite was measured by XRF, the ratio was 12 (Si/Al=6), and the obtained AEI type zeolite was substantially identical to the AEI type zeolite of Comparative Example 3 of Patent Literature 5. When the acidity of this zeolite was measured, the acidity was 1.12 mmol/g. The results of the low $SiO_2/Al_2O_3$ ratio and the low acidity mean that crystallinity for a zeolite is very unfavorable. This matches a description that "It was understood that the nitrogen oxide reduction rates of the AEI zeolite decreased markedly when it underwent 1 hour of hydrothermal durability treatment." in paragraph [0108] in Patent Literature 5.

The amounts of the raw materials used in the mixtures prior to reaction, hydrothermal synthesis conditions, yields, Si/Al ratios, acidities, and average primary particle diameters in Examples 1 to 5, 7 to 29, and 31 to 38, and Comparative Examples 1 to 3, 5, and 6 described above are summarized in Tables 10 to 13.

In Tables 10 to 13, each numerical value within the parentheses underneath the amount (g) of each raw material indicates the following:

Al(OH)$_3$:molar ratio of Al to Si included in mixture of raw materials other than zeolite added in the present invention;

alkali metal atom material:molar ratio of alkali metal atoms (Na, K, or Cs) to SDA in mixture of raw materials;

*molar ratio of alkaline earth metal atoms (Ca) to SDA in mixture of raw materials in the case of adding alkaline earth metal;

SDA:molar ratio of SDA to Si included in mixture of raw materials other than zeolite added in the present invention;

Water:molar ratio of water to Si included in mixture of raw materials other than zeolite added in the present invention;

Added zeolite (Examples): rate (% by weight) of zeolite added in the present invention to amount of SiO$_2$ into which all Si included in mixture of raw materials other than zeolite added in the present invention is converted; and Added zeolite (Comparative Examples): rate (% by weight) of added zeolite to amount of SiO$_2$ into which all Si included in mixture of raw materials other than added zeolite is converted.

The yields (% by weight) were calculated from the following equation:

(Yield)=(weight(g) of AEI type zeolite including SDA)/{(weights(g) of Al$_2$O$_3$ and SiO$_2$ into which aluminum atom material and silicon atom material added in production are converted, respectively)+(weight(g) of zeolite added in the present invention)}×100.

TABLE 10

| | | Pre-reaction mixture(g) | | | | | | |
|---|---|---|---|---|---|---|---|---|
| | | Silicon Atom Raw Material | | Added Zeolite | | Alkali Metal Atom Raw Material | | |
| | Al(OH)$_3$ | Silica Source | Charged Amount | Kind | Charged Amount | Kind | Charged Amount | SDA | Water |
| Example 1 | 0.4 (0.10) | SNOWTEX 40 | 5.5 | AEI TYPE (uncalcined product) | 0.1 (5) | NaOH | 0.3 (0.50) | 11.7 (0.40) | 1.8 (20) |
| Example 2 | 0.4 (0.06) | SNOWTEX 40 | 7 | AEI TYPE (uncalcined product) | 0.2 (5) | NaOH | 0.4 (0.50) | 14.6 (0.40) | 2.3 (20) |
| Example 3 | 0.4 (0.10) | SNOWTEX 40 | 5.5 | AEI TYPE (uncalcined product) | 0.1 (5) | NaOH | 0.3 (0.57) | 10.2 (0.35) | 3 (20) |
| Example 4 | 0.4 (0.10) | SNOWTEX 40 | 5.5 | AEI TYPE (uncalcined product) | 0.1 (5) | NaOH | 0.3 (0.50) | 11.7 (0.40) | 1.8 (20) |
| Example 5 | 0.4 (0.10) | SNOWTEX 40 | 5.5 | AEI TYPE (uncalcined product) | 0.1 (5) | NaOH | 0.3 (0.50) | 11.7 (0.40) | 1.8 (20) |
| Example 7 | 0.4 (0.11) | SNOWTEX 40 | 5.5 | CHA TYPE (uncalcined product) | 0.1 (5) | NaOH | 0.3 (0.50) | 11.7 (0.40) | 1.8 (22) |
| Example 8 | 0.3 (0.11) | SNOWTEX 40 | 4.1 | CHA TYPE (uncalcined product) | 0.1 (5) | NaOH | 0.2 (0.50) | 8.8 (0.43) | 1.4 (22) |
| Example 9 | 0.4 (0.15) | SNOWTEX 40 | 4.0 | CHA TYPE (calcined product) | 0.1 (5) | NaOH | 0.2 (0.50) | 8.8 (0.44) | 1.4 (22) |
| Example 10 | 0.4 (0.11) | SNOWTEX 40 | 5.5 | AEI TYPE (uncalcined product) | 0.1 (5) | NaOH | 0.3 (0.50) | 11.7 (0.43) | 1.8 (22) |
| Example 11 | 0.4 (0.11) | SNOWTEX 40 | 5.5 | AEI TYPE (uncalcined product) | 0.1 (5) | NaOH | 0.3 (0.50) | 11.7 (0.43) | 1.8 (22) |
| Example 12 | 0.3 (0.11) | SNOWTEX 40 | 4.1 | AEI TYPE (uncalcined product) | 0.1 (5) | NaOH | 0.2 (0.33) | 9.9 (0.49) | 0.5 (22) |
| Example 13 | 0.2 (0.6) | SNOWTEX 40 | 5.7 | AEI TYPE (uncalcined product) | 0.1 (5) | NaOH | 0.3 (0.50) | 11.7 (0.42) | 1.8 (21) |
| Example 14 | 0.4 (0.11) | SNOWTEX 40 | 5.5 | AEI TYPE (uncalcined product) | 0.1 (5) | NaOH | 0.3 (0.50) | 11.7 (0.43) | 1.8 (22) |
| Example 15 | 0.4 (0.11) | SNOWTEX 40 | 5.5 | AEI TYPE (uncalcined product) | 0.1 (5) | NaOH | 0.3 (0.50) | 11.7 (0.43) | 1.8 (22) |

| | | Hydrothermal Synthesis Conditions | | | | | Average Primary Particle |
|---|---|---|---|---|---|---|---|
| | Aging | Temperature (° C.) | Time (day(s)) | Yield (%) | Si/Al Ratio | Acidity (mmol/g) | Diameter (μm) |
| Example 1 | No | 170 | 4 | 73 | 6.1 | 1.78 | 1.68 |
| Example 2 | No | 170 | 4 | 79 | 5.8 | — | 1.61 |
| Example 3 | No | 170 | 4 | 66 | 5.2 | — | 1.26 |
| Example 4 | No | 135 | 4 | 59 | 4.9 | — | 0.73 |

TABLE 10-continued

|  | Aging | Temperature (°C.) | Time (day(s)) | Yield (%) | Si/Al Ratio | Acidity (mmol/g) | Average Primary Particle Diameter |
|---|---|---|---|---|---|---|---|
| Example 5 | Yes | 170 | 4 | 70 | 5.3 | — | 1.89 |
| Example 7 | No | 170 | 4 | 75 | 5.2 | — | 0.55 |
| Example 8 | No | 180 | 1 | 74 | 4.7 | 2.12 | 1.08 |
| Example 9 | No | 180 | 1 | 85 | 4.5 | — | 0.57 |
| Example 10 | No | 170 | 2 | 72 | 5.5 | — | 1.45 |
| Example 11 | No | 170 | 4 | 72 | 5.5 | — | 1.29 |
| Example 12 | No | 170 | 4 | 74 | 5.1 | — | 0.78 |
| Example 13 | No | 180 | 4 | 80 | 5.3 | — | 1.24 |
| Example 14 | No | 180 | 4 | 83 | 4.9 | 1.65 | 1.24 |
| Example 15 | No | 135 | 7 | 72 | 4.5 | 2.20 | 0.86 |

TABLE 11

| | Pre-reaction mixture(g) | | | | | | | |
|---|---|---|---|---|---|---|---|---|
| | | Silicon Atom Raw Material | | Added Zeolite | | Alkali Metal Atom | | |
| | Al(OH)$_3$ | Silica Source | Charged Amount | Kind | Charged Amount | Kind | Charged Amount | SDA | Water |
| Example 16 | 0.4 (0.11) | SNOWTEX 40 | 5.5 | AEI TYPE (uncalcined product) | 0.1 (5) | NaOH KOH | 0.2 (0.38) 0.1 (0.13) | 11.7 (0.40) | 1.8 (20) |
| Example 17 | 0.3 (0.7) | SNOWTEX 40 | 5.6 | AEI TYPE (uncalcined product) | 0.1 (5) | NaOH KOH | 0.2 (0.38) 0.1 (0.13) | 11.7 (0.39) | 1.8 (21) |
| Example 18 | 0.2 (0.7) | SNOWTEX 40 | 4.2 | AEI TYPE (uncalcined product) | 0.1 (5) | NaOH C$_S$OH | 0.2 (0.38) 0.3 (0.13) | 8.8 (0.40) | 1.4 (20) |
| Example 19 | 0.5 (0.13) | CATALOID SI-30 | 7.9 | AEI TYPE (calcined product) | 0.1 (5) | KOH | 0.8 (2.00) | 4.4 (0.15) | 1.6 (15) |
| Example 20 | 0.5 (0.13) | CATALOID SI-30 | 7.9 | AEI TYPE (uncalcined product) | 0.1 (5) | KOH | 0.8 (2.00) | 4.4 (0.15) | 1.6 (15) |
| Example 21 | 0.5 (0.13) | CATALOID SI-30 | 7.9 | AEI TYPE (calcined product) | 0.1 (5) | KOH C$_S$OH | 0.7 (1.67) 0.4 (0.33) | 4.4 (0.15) | 1.6 (15) |
| Example 22 | 0.5 (0.13) | Fumed Silica | 2.4 | AEI TYPE (calcined product) | 0.1 (5) | KOH | 0.8 (2.00) | 4.4 (0.15) | 7.0 (15) |
| Example 23 | 0.5 (0.13) | CATALOID SI-30 | 7.9 | AEI TYPE (calcined product) | 0.1 (5) | KOH CsOH | 0.7 (1.67) 0.4 (0.33) | 4.4 (0.15) | 1.6 (15) |
| Example 24 | 0.5 (0.13) | SNOWTEX 40 | 6 | AEI TYPE (calcined product) | 0.1 (5) | KOH CsOH | 0.7 (1.67) 0.4 (0.33) | 4.4 (0.15) | 3.4 (15) |

| | Aging | Hydrothermal Synthesis Conditions | | Yield (%) | Si/Al Ratio | Acidity (mmol/g) | Average Primary Particle Diameter |
|---|---|---|---|---|---|---|---|
| | | Temperature (°C.) | Time (day(s)) | | | | |
| Example 16 | No | 170 | 3 | 81 | 4.9 | — | 1.18 |
| Example 17 | No | 170 | 4 | 52 | 5.6 | — | 1.12 |
| Example 18 | No | 170 | 2 | 61 | 5.5 | — | 1.58 |
| Example 19 | No | 175 | 3 | 92 | 4.6 | — | 0.56 |
| Example 20 | No | 175 | 3 | 87 | 4.7 | — | 0.15 |
| Example 21 | No | 180 | 3 | 97 | 5.2 | — | 0.17 |
| Example 22 | No | 175 | 3 | 85 | 4.4 | — | 0.31 |
| Example 23 | No | 175 | 2 | 98 | 4.8 | — | 0.14 |
| Example 24 | No | 175 | 2 | 95 | 5.1 | — | 0.14 |

TABLE 12

| | Pre-reaction mixture(g) | | | | | | | |
|---|---|---|---|---|---|---|---|---|
| | | Silicon Atom Raw Material | | Added Zeolite | | Alkali Metal Atom Raw Material | | |
| | Al(OH)$_3$ | Silica Source | Charged Amount | Kind | Charged Amount | Kind | Charged Amount | SDA | Water |
| Example 25 | 0.5 (0.13) | CATALOID SI-30 | 7.9 | AEI TYPE (uncalcined product) | 0.1 (5) | KOH | 0.8 (2.00) | 4.4 (0.15) | 1.6 (15) |
| Example 26 | 0.5 (0.13) | SNOWTEX 40 | 6 | AEI TYPE (uncalcined product) | 0.1 (5) | KOH | 0.8 (3.00) | 2.9 (0.10) | 1.0 (10) |
| Example 27 | 0.5 (0.13) | SNOWTEX 40 | 6 | AEI TYPE (uncalcined product) | 0.1 (5) | KOH C$_S$OH | 0.7 (2.50) 0.4 (0.50) | 2.9 (0.10) | 4.6 (15) |
| Example 28 | 0.5 (0.13) | SNOWTEX 40 | 6 | AEI TYPE (uncalcined product) | 0.1 (5) | KOH C$_S$OH | 0.7 (2.50) 0.4 (0.50) | 2.9 (0.10) | 4.6 (15) |
| Example 29 | 0.5 (0.13) | SNOWTEX 40 | 6 | AEI TYPE (uncalcined product) | 0.1 (5) | KOH | 0.8 (2.00) | 4.4 (0.15) | 3.5 (15) |
| Comparative Example 1 | 0.2 (0.05) | SNOWTEX 40 | 5.7 | — | 0 | NaOH | 0.6 (2.67) | 4.4 (0.15) | 14.7 (30) |
| Comparative Example 2 | 0.4 (0.10) | SNOWTEX 40 | 5.5 | — | 0 | NaOH | 0.3 (0.50) | 11.7 (0.40) | 1.8 (20) |
| Comparative Example 3 | 0 | SNOWTEX 40 | 1.9 | Y TYPE | 2.4 (317) | 1M NaOH | 20.5 (2.67) | 5.5 (0.15) | 1.9 (30) |
| Comparative Example 5 | 0.4 (0.10) | SNOWTEX 40 | 5.5 | Y TYPE | 0.1 (5) | NaOH | 0.3 (0.50) | 11.7 (0.40) | 1.8 (20) |

| | | Hydrothermal Synthesis Conditions | | | | | Average Primary Particle |
|---|---|---|---|---|---|---|---|
| | Aging | Temperature (° C.) | Time (day(s)) | Yield (%) | Si/Al Ratio | Acidity (mmol/g) | Diameter (μm) |
| Example 25 | No | 175 | 2 | 91 | 5.0 | — | 0.13 |
| Example 26 | No | 175 | 2 | 88 | 4.7 | — | 0.31 |
| Example 27 | No | 175 | 2 | 98 | 5.2 | — | 0.09 |
| Example 28 | No | 185 | 1 | 98 | 5.1 | — | 0.09 |
| Example 29 | No | 175 | 1 | 91 | 4.8 | — | 0.11 |
| Comparative Example 1 | No | 135 | 7 | 0 | — | — | — |
| Comparative Example 2 | No | 170 | 4 | 0 | — | — | — |
| Comparative Example 3 | No | 135 | 7 | 45 | 7.3 | 1.11 | 1.48 |
| Comparative Example 5 | No | 170 | 4 | 0 | — | — | — |

TABLE 13

| | Pre-reaction mixture(g) | | | | | | | |
|---|---|---|---|---|---|---|---|---|
| | | Silicon Atom Raw Material | | Added Zeolite | | Alkali Metal Atom Raw Material* | | |
| | Al(OH)$_3$ | Silica Source | Charged Amount | Kind | Charged Amount | Kind | Charged Amount | SDA | Water |
| Example 31 | 0.3 (0.11) | SNOWTEX 40 | 3.4 | CHA TYPE (calcined product) | 0.1 (5) | NaOH | 0.2 (0.54) | 7.6 (0.40) | 1.7 (22) |
| Example 32 | 0.6 (0.15) | SNOWTEX 40 | 6.0 | CHA TYPE (uncalcined product) | 0.1 (5) | KOH | 0.7 (1.67) | 4.4 (0.15) | 5.3 (18) |
| Example 33 | 13.9 (0.15) | SNOWTEX 40 | 140.9 | CHA TYPE (uncalcined product) | 2.9 (5) | KOH | 15.7 (1.67) | 109.1 (0.15) | 120.5 (18) |
| Example 34 | 0.5 (0.17) | SNOWTEX 40 | 4.5 | AEI TYPE (uncalcined product) | 0.1 (5) | KOH | 0.5 (1.67) | 3.3 (0.15) | 4.4 (18) |

TABLE 13-continued

| | | | | | | | | | | |
|---|---|---|---|---|---|---|---|---|---|---|
| Example 35 | 0.3 (0.11) | SNOWTEX 40 | 4.1 | AEI TYPE (uncalcined product) | 0.1 (5) | NaOH Ca(OH)$_2$ | 0.2 (0.54) 0.02 (0.03) | | 8.7 (0.40) | 2.4 (22) |
| Example 36 | 0.3 (0.11) | SNOWTEX 40 | 4.1 | AEI TYPE (uncalcined product) | 0.1 (5) | NaOH Ca(OH)$_2$ | 0.2 (0.54) 0.04 (0.04) | | 8.7 (0.40) | 2.4 (22) |
| Example 37 | 0.3 (0.11) | SNOWTEX 40 | 3.4 | AEI TYPE (uncalcined product) | 0.1 (5) | NaOH Ca(OH)$_2$ | 0.2 (0.54) 0.02 (0.03) | | 7.6 (0.40) | 1.7 (22) |
| Example 38 | 0.3 (0.11) | SNOWTEX 40 | 3.4 | AEI TYPE (uncalcined product) | 0.1 (5) | NaOH Ca(OH)$_2$ | 0.2 (0.54) 0.04 (0.05) | | 7.3 (0.40) | 2.0 (22) |
| Comparative Example 6 | 7.0 (0.06) | Silicate soda | 46.9 | Y TYPE | 3.5 (26) | — | | 0 | 33.1 (0.16) | 168.8 (46) |

| | Aging | Hydrothermal Synthesis Conditions | | Yield (%) | Si/Al Ratio (XRF) | Acidity (mmol/g) | Average Primary Particle Diameter (μm) |
|---|---|---|---|---|---|---|---|
| | | Temperature (° C.) | Time (day(s)) | | | | |
| Example 31 | Yes | 170 | 2 | 71 | 4.5 | — | 0.28 |
| Example 32 | No | 185 | 1 | 97 | 4.3 | — | 0.44 |
| Example 33 | No | 185 | 1 | 91 | 5.5 | — | 0.56 |
| Example 34 | No | 185 | 1 | 90 | 5.2 | — | 0.62 |
| Example 35 | No | 170 | 2 | 69 | 4.6 | — | 0.33 |
| Example 36 | No | 170 | 2 | 69 | 4.4 | — | 0.43 |
| Example 37 | No | 170 | 1 | 64 | 4.3 | — | 0.35 |
| Example 38 | Yes | 170 | 2 | 71 | 4.6 | — | 0.33 |
| Comparative Example 6 | No | 135 | 15 | 30 | 6.0 | 1.12 | 0.45 |

*The case of adding an alkaline earth metal was also described in this column.

[Preparation of Catalyst/Evaluation of Catalytic Activity]

Example 6

The zeolite 1 synthesized in Example 1 was calcined under airflow at 600° C. for 6 hours in order to remove organic substances in the zeolite. Then, the calcined zeolite was dispersed in a 3M aqueous NH$_4$Cl solution and subjected to ion exchanged at 60° C. for 5 hours in order to remove Na ions in the calcined zeolite. The zeolite was collected by filtration and washed with ion-exchanged water three times. Then, the ion exchanging and washing described above were further repeated twice. The obtained zeolite powder was dried at 100° C. for 12 hours to obtain a NH$_4$ type zeolite 1A. The results of the analysis of the zeolite 1A in XRF confirmed that 99% or more of Na was removed.

An aqueous copper(II) acetate solution was obtained by dissolving 1 g of Cu(OAc)$_2$.H$_2$O (manufactured by KISHIDA CHEMICAL Co., Ltd.) in 37 g of water. The zeolite 1A was dispersed in the aqueous copper(II) acetate solution and subjected to ion exchange at 40° C. for 1.5 hours. A zeolite (zeolite 1B) was collected by filtration and washed with ion-exchanged water three times. Then, 1 g of Cu(OAc)$_2$.H$_2$O (manufactured by KISHIDA CHEMICAL Co., Ltd.) was dissolved in 37 g of water again to prepare an aqueous copper (II) acetate solution, and the zeolite 1B was dispersed in the aqueous copper(II) acetate solution and subjected to ion exchange at 80° C. for 2 hours. A zeolite (zeolite 1C) was collected by filtration and washed with ion-exchanged water three times to obtain a zeolite powder, which was dried at 100° C. for 12 hours and thereafter calcined in air at 450° C. for 1 hour, thereby obtaining a catalyst 1A including a Cu-containing AEI type zeolite.

The content of Cu in the catalyst 1A based on XRF analysis was 3.9% by weight.

The result of measurement of the BET specific surface area of the catalyst 1A was 601 m$^2$/g.

Figure 2:
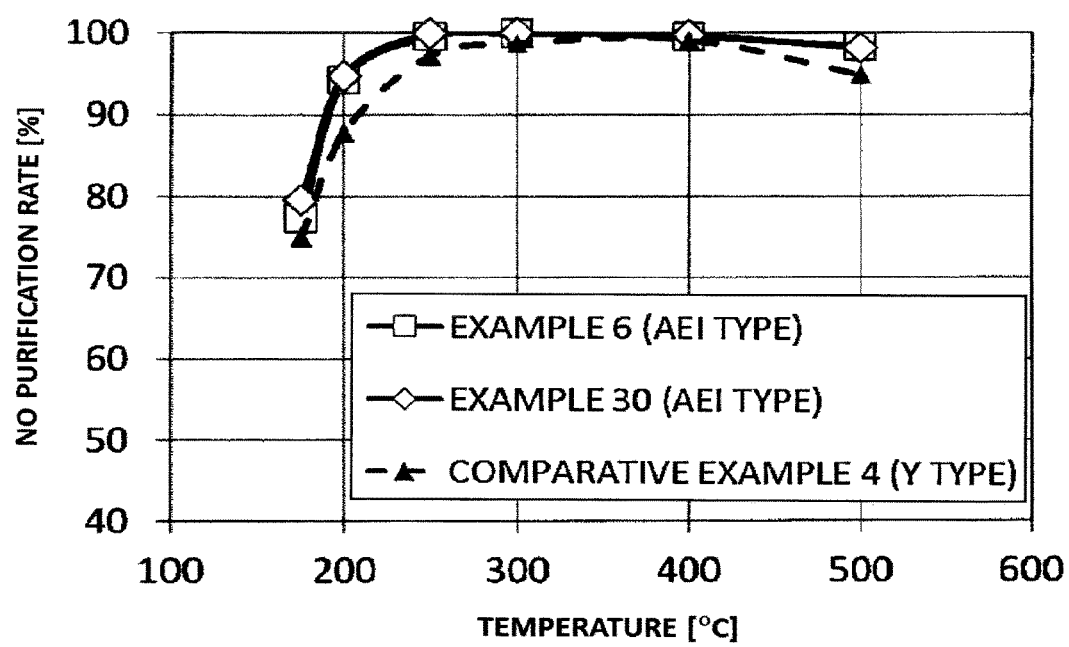
FIG. 2 is a graph illustrating the evaluation results of the catalytic activities of a catalyst 1A in Example 6, a catalyst 2A in Example 30, and a catalyst 3A in Comparative Example 4.

In addition, the evaluation results of the catalytic activity of the catalyst 1A were indicated in Table 14 and FIG. 2.

Example 30

The zeolite 26 synthesized in Example 26 was calcined under airflow at 550° C. for 6 hours in order to remove organic substances in the zeolite. Then, the calcined zeolite was dispersed in a 3M aqueous NH$_4$Cl solution and subjected to ion exchanged at 70° C. for 5 hours in order to remove Na and K ions in the zeolite. The zeolite was collected by filtration and washed with ion-exchanged water three times. The obtained zeolite powder was dried at 100° C. for 12 hours to obtain a NH$_4$ type zeolite 26A.

An aqueous copper(II) acetate solution was obtained by dissolving 2.2 g of Cu(OAc)$_2$.H$_2$O (manufactured by KISHIDA CHEMICAL Co., Ltd.) in 74 g of water. The zeolite 26A was dispersed in the aqueous copper(II) acetate solution and subjected to ion exchange at 70° C. for 2 hours. A zeolite (zeolite 26B) was collected by filtration and washed with ion-exchanged water three times. Then, 2.2 g of Cu(OAc)$_2$.H$_2$O (manufactured by KISHIDA CHEMICAL Co., Ltd.) was dissolved in 74 g of water again to prepare an aqueous copper(II) acetate solution, and the zeolite 26B was dispersed in the aqueous copper(II) acetate solution and subjected to ion exchange at 70° C. for 2 hours.

A zeolite (zeolite 26C) was collected by filtration and washed with ion-exchanged water three times to obtain a zeolite powder, which was dried at 100° C. for 12 hours and thereafter calcined in air at 500° C. for 3 hours, thereby obtaining a catalyst 2A including a Cu-containing AEI type zeolite. The results of the analysis of the catalyst 2A in ICP confirmed that 0.77% by weight of K remained.

The content of Cu of the catalyst 2A based on XRF analysis was 4.8% by weight.

The result of measurement of the BET specific surface area of the catalyst 2A was 579 m$^2$/g.

In addition, the evaluation results of the catalytic activity of the catalyst 2A were indicated in Table 14 and FIG. 2.

<Composition Analysis by $^{29}$Si-NMR>

Analysis by Si-NMR as described above is preferred for calculating a ratio of Si/Al existing in the zeolite framework of the AEI type zeolite obtained by the production method of the present invention.

Figure 4:
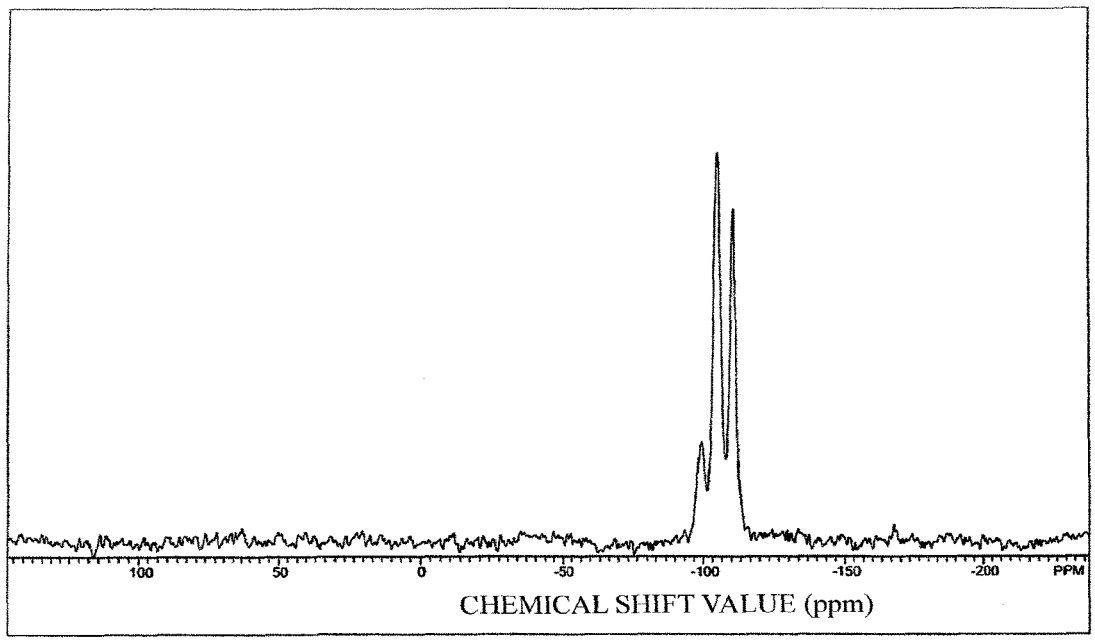
FIG. 4 illustrates the $^{29}$Si-NMR spectrum of a zeolite synthesized in Example 31.

As a result of $^{29}$Si-NMR analysis of the solid obtained in Example 31 in the state of being uncalcined, it was found that the solid had a Si/Al ratio of 4.9 in a framework. The measurement results in this case are indicated in FIG. 4. With regard to the belongings of peaks, SARs were calculated assuming that a peak at a peak top of −99±1 ppm was Q$^4$ (2Al), a peak at −104±1 ppm was Q$^4$ (1Al), and a peak at −110±1 ppm was Q$^4$ (0Al).

In contrast, a Si/Al ratio in the state of a bulk was calculated in XRF, and as a result of calculation of the Si/Al ratio of the solid obtained in Example 31 in XRF, the Si/Al ratio was found to be 4.5. Accordingly, the analysis results of the Si/Al ratios in $^{29}$Si-NMR and XRF revealed that most of Al atoms in the solid existed in the zeolite framework of the AEI type zeolite obtained by the production method according to the present invention.

As a result of measurement of $^{29}$Si-NMR after calcining of the solid of Example 26 to remove SDA, the Si/Al ratio in the framework thereof was 5.6. The Si/Al ratio in the state of a bulk in XRF was 4.7, and it is estimated that slight dealuminization was caused by the calcining; however, crystallinity was hardly deteriorated.

Typically, a zeolite having a low Si/Al ratio is considered to have the unfavorable dispersibility of Al in a framework. However, the zeolite obtained in the present invention has the high rate of a peak area at Q$^4$ (1Al) obtained by measurement in $^{29}$Si-NMR although having a low Si/Al ratio, and has a feature that Al is dispersed. The high rate of 1Al facilitates introduction of a transition metal which becomes an active site in a catalyst. Q$^4$ (0Al) indicates that the rate of the presence of Al bound to Si through oxygen is zero, and the more area rate thereof indicates that it is more difficult to introduce a transition metal. In contrast, the peak of Q$^4$ (nAl) (n≥2) indicates that two or more Al atoms bound to Si through oxygen are present, and a transition metal coordinated in advance is considered to inhibit a transition metal from coordinating to near Al due to the presence of the Al atoms close to each other. Therefore, the peak area of Q$^4$ (1Al) is typically 44% or more, preferably 44.5% or more, more preferably 45% or more, and still more preferably 45.5% or more, for introducing more transition metals which become active sites in a catalyst. The upper limit thereof is not particularly limited.

For each spectrum peak after Fourier transformation, waveform separation analysis was performed by the optimization calculation of a peak shape created by a Lorentz waveform, a Gauss waveform, or a mixture of both. In the optimization calculation, an optimum value was calculated by a nonlinear least-squares method with a center position, a height, and a half-width as variable parameters.

For identification of each peak, Reference was made to G. Engelhardt and D. Miche: "High-Resolution Solid-State NMR of Silicates and Zeolites", (1987), (John Wiley & Sons, Chichester), and the like.

Comparative Example 4

The zeolite 6 synthesized in Comparative Example 3 was calcined under airflow at 600° C. for 6 hours in order to remove organic substances in the zeolite. Then, the calcined zeolite was dispersed in a 3M aqueous NH$_4$Cl solution and subjected to ion exchanged at 60° C. for 3 hours in order to remove Na ions in the calcined zeolite. The zeolite was collected by filtration and washed with ion-exchanged water three times. Then, the ion exchanging and washing described above were further repeated twice. The obtained zeolite powder was dried at 100° C. for 12 hours to obtain a NH$_4$ type zeolite 6A. The results of the analysis of the zeolite 6A in XRF confirmed that 99% or more of Na was removed.

An aqueous copper(II) acetate solution was obtained by dissolving 1 g of Cu(OAc)$_2$.H$_2$O (manufactured by KISHIDA CHEMICAL Co., Ltd.) in 37 g of water. The zeolite 6A was dispersed in the aqueous copper(II) acetate solution and subjected to ion exchange at 60° C. for 1 hour. A zeolite (zeolite 6B) was collected by filtration and washed with ion-exchanged water three times. Then, 1 g of Cu(OAc)$_2$.H$_2$O (manufactured by KISHIDA CHEMICAL Co., Ltd.) was dissolved in 37 g of water again to prepare an aqueous copper(II) acetate solution, and the zeolite 6B was dispersed in the aqueous copper(II) acetate solution and subjected to ion exchange at 80° C. for 1 hour. A zeolite (zeolite 6C) was collected by filtration and washed with ion-exchanged water three times to obtain a zeolite powder, which was dried at 100° C. for 12 hours and thereafter calcined in air at 450° C. for 1 hour, thereby obtaining a catalyst 3A including a Cu-containing AEI type zeolite.

The content of Cu in the catalyst 3A based on XRF analysis was 3.8% by weight.

The result of measurement of the BET specific surface area of the catalyst 3A was 612 m$^2$/g.

In addition, the evaluation results of the catalytic activity of the catalyst 3A were indicated in Table 14 and FIG. 2.

TABLE 14

| | | NO Purification Rate (%) | | | | | |
|---|---|---|---|---|---|---|---|
| | Catalyst | 175° C. | 200° C. | 250° C. | 300° C. | 400° C. | 500° C. |
| Example 6 | Catalyst 1A | 77.3 | 94.2 | 99.5 | 99.0 | 99.5 | 98.3 |
| Example 30 | Catalyst 2A | 79.6 | 94.7 | 99.9 | 100 | 99.7 | 98.1 |
| Comparative Example 4 | Cataiyst 3A | 75.0 | 87.8 | 97.1 | 98.7 | 99.1 | 94.8 |

With regard to activity in a low-temperature region considered to be important in exhaust gas treatment, comparisons of the concentrations of NO remaining in gases after the reactions of the catalyst 1A, the catalyst 2A, and the catalyst 3A at 200° C. revealed that the concentrations of remaining NO in the cases of the catalyst 1A and the catalyst 2A were one-half or less of that in the case of the catalyst 3A.

The above results reveal that the catalytic activity of the AEI type zeolite of the present invention is higher than that of an AEI type zeolite using a Y type zeolite as a raw material.

Figure 3:
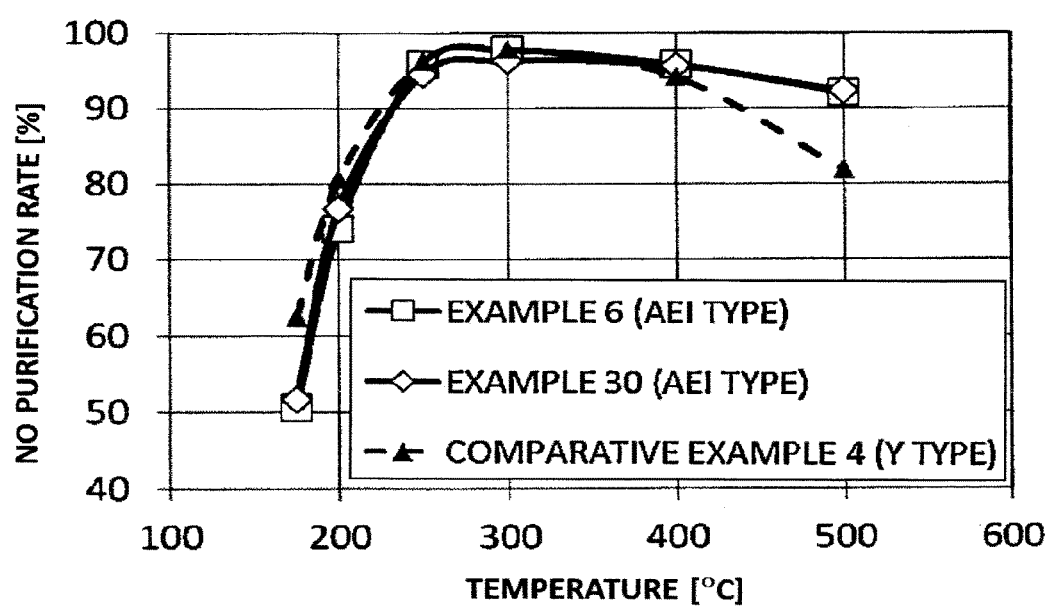
FIG. 3 is a graph illustrating the evaluation results of the catalytic activities of a catalyst 1B in Example 6, a catalyst 2B in Example 30, and a catalyst 3B in Comparative Example 4.

Catalysts obtained by performing steam treatment of the catalysts 1A, 2A, and 3A by the above-described method were regarded as catalysts 1B, 2B, and 3B, respectively. The evaluation results of the catalytic activities of the catalysts 1B, 2B, and 3B are indicated in Table 15 and FIG. 3.

TABLE 15

| | | NO Purification Rate (%) | | | | | |
|---|---|---|---|---|---|---|---|
| | Catalyst | 175° C. | 200° C. | 250° C. | 300° C. | 400° C. | 500° C. |
| Example 6 | Catalyst 1B | 50.6 | 74.0 | 95.8 | 97.7 | 95.8 | 92.0 |
| Example 30 | Catalyst 2B | 51.7 | 76.7 | 94.5 | 96.3 | 95.6 | 92.3 |
| Comparative Example 4 | Catalyst 3B | 62.4 | 80.6 | 96.2 | 97.8 | 94.1 | 81.8 |

Typically, hydrothermal treatment of a catalyst for exhaust gas treatment tends to result in the aggregation of Cu supported as an active site aggregates, in the promotion of the oxidation of $NH_3$, and in a decrease in activity in a high-temperature region. However, comparisons of the concentrations of NO remaining in gases after the reactions of, at 500° C., the respective catalysts subjected to hydrothermal treatment in this case revealed that the concentrations of remaining NO in the cases of the catalyst 1B and the catalyst 2B were one-half or less of that in the case of the catalyst 3B.

The above results reveal that the activity of the AEI type zeolite of the present invention is higher than that of an AEI type zeolite using a Y type zeolite as a raw material in a high-temperature region even after hydrothermal treatment. This is considered to be because the Si/Al ratio of the AEI type zeolite of the present invention was lower than that of the AEI type zeolite using the Y type zeolite as the raw material, about two Al atoms coordinated to d6r constituting a crystal structure, and divalent Cu coordinated optimally to d6r, thereby enhancing stability and inhibiting the aggregation of Cu due to the hydrothermal treatment.

INDUSTRIAL APPLICABILITY

The present invention enables an inexpensive, high-performance AEI type zeolite to be obtained, and the zeolite can be preferably used in exhaust gas treatment as well as in a catalyst, a separation membrane, or the like. In addition, the AEI type zeolite having a Si/Al ratio of 6.5 or less and favorable crystallinity can be provided, thereby providing a high-performance catalyst using the zeolite especially having an excellent purification performance particularly at a low temperature (for example, 200 to 250° C.).

The invention claimed is:

1. A method for producing an AEI type zeolite having a Si/Al ratio of 50 or less as measured by X-ray fluorescence analysis (XRF), the method comprising:
    preparing a mixture comprising a silicon atom material, an aluminum atom material, an alkali metal atom material, an organic structure-directing agent, and water; and
    performing hydrothermal synthesis by using the mixture obtained, wherein
    the aluminum atom material is a compound having a Si content of 20% by weight or less and comprising aluminum; and
    the mixture comprises a zeolite having a framework density of 14 T/1000 Å$^3$ or more in an amount of 0.1% by weight or more with respect to $SiO_2$ assuming that all Si atoms in the mixture are formed in $SiO_2$.

2. The method for producing an AEI type zeolite according to claim 1, wherein 50 mol % or more of alkali metal atoms contained in the alkali metal atom material in the mixture is sodium; and a molar ratio of sodium to the organic structure-directing agent in the mixture is from 0.1 to 2.5.

3. The method for producing an AEI type zeolite according to claim 1, wherein less than 50 mol % of alkali metal atoms contained in the alkali metal atom material in the mixture is sodium; and a total molar ratio of alkali metal atoms to the organic structure-directing agent in the mixture is from 1.0 to 10.

4. The method for producing an AEI type zeolite according to claim 1, wherein the aluminum atom material is at least one selected from the group consisting of aluminum hydroxide, aluminum nitrate, aluminum sulfate, aluminum oxide, sodium aluminate, boehmite, pseudoboehmite, and aluminum alkoxide.

5. The method for producing an AEI type zeolite according to claim 1, wherein d6r defined as a composite building unit by the International Zeolite Association (IZA) is contained in a framework of the zeolite having a framework density of 14 T/1000 Å$^3$ or more.

6. The method for producing an AEI type zeolite according to claim 1, wherein the zeolite having a framework density of 14 T/1000 Å$^3$ or more is an AEI type and/or a CHA type.

7. The method for producing an AEI type zeolite according to claim 1, wherein the organic structure-directing agent in the mixture is N,N-dimethyl-3,5-dimethylpiperidinium hydroxide.

8. A method for producing a catalyst, the method comprising:
    performing the method according to claim 1 to obtain an AEI type zeolite; and
    supporting Cu on the AEI type zeolite obtained.

9. The method according to claim 8, wherein the catalyst is a honeycomb catalyst being applied to a honeycomb.

10. The method according to claim 8, wherein the catalyst is a catalyst molded article formed by molding the catalyst.

11. A method for purifying a nitrogen oxide, the method comprising:
    performing the method according to claim 8; and
    bringing a nitrogen oxide into contact with a reducing agent in presence of the catalyst.

12. The method for purifying a nitrogen oxide according to claim 11, wherein the reducing agent is a nitrogen-containing compound.

13. The method for purifying a nitrogen oxide according to claim 12, wherein the nitrogen-containing compound is ammonia.

\* \* \* \* \*